US012569965B2

(12) United States Patent
Yang et al.

(10) Patent No.: US 12,569,965 B2
(45) Date of Patent: *Mar. 10, 2026

(54) DRIVING AND CONTROLLING MECHANISM AND NAIL GUN HAVING SAME

(71) Applicant: TAIZHOU DAJIANG IND. CO. LTD., Wenling (CN)

(72) Inventors: Tao Yang, Wenling (CN); Mingjun Yang, Wenling (CN); Jinquan Huang, Wenling (CN); Haijun Li, Wenling (CN); Weirong Zhou, Wenling (CN)

(73) Assignee: TAIZHOU DAJIANG IND. CO. LTD., Wenling (CN)

( * ) Notice: Subject to any disclaimer, the term of this patent is extended or adjusted under 35 U.S.C. 154(b) by 184 days.

This patent is subject to a terminal disclaimer.

(21) Appl. No.: 18/368,702

(22) Filed: Sep. 15, 2023

(65) Prior Publication Data

US 2024/0091918 A1 Mar. 21, 2024

(30) Foreign Application Priority Data

Sep. 15, 2022 (CN) ......................... 202211124789.2
Sep. 15, 2022 (CN) ......................... 202211125027.4
Sep. 15, 2022 (CN) ......................... 202222460952.4
Sep. 15, 2022 (CN) ......................... 202222461735.7

(51) Int. Cl.
*B25C 1/00* (2006.01)
*B25C 1/06* (2006.01)

(52) U.S. Cl.
CPC ................ *B25C 1/008* (2013.01); *B25C 1/06* (2013.01)

(58) Field of Classification Search
CPC .................................. B65C 1/008; B65C 1/06
USPC .............................................................. 227/8
See application file for complete search history.

(56) References Cited

U.S. PATENT DOCUMENTS 12,257,681 B2 * 3/2025 Yang ........................ B25C 1/047
2022/0040836 A1 * 2/2022 Chien ........................ B25C 1/06

FOREIGN PATENT DOCUMENTS

CN 215395034 U 1/2022

* cited by examiner

*Primary Examiner* — Veronica Martin
*Assistant Examiner* — Mary C Hibbert-Copeland
(74) *Attorney, Agent, or Firm* — Tim Tingkang Xia, Esq.; Troutman Pepper Locke LLP

(57) ABSTRACT

A nail gun having a driving and controlling mechanism. The driving and controlling mechanism comprises a driving assembly disposed inside a casing of the nail gun for striking nails in a striking direction; and a control assembly controlling the driving assembly. The driving assembly comprises a piston movably disposed inside the casing and attached to a striking member for striking the nails; at least one power spring in contact with the piston; a pushing component for pushing the piston towards the power spring; and a motor for rotating the pushing component. The control assembly comprises a main switch configured to produce a first electronic signal; and a safety switch configured to produce a second electronic signal. The main switch and the safety switch are in communication with the motor such that the motor is configured to operate when it receives both the first electronic signal and the second electronic signal.

18 Claims, 21 Drawing Sheets

DRIVING AND CONTROLLING MECHANISM AND NAIL GUN HAVING SAME

CROSS-REFERENCE TO RELATED PATENT APPLICATIONS

This application claims priority to and benefit of Chinese Patent Application Nos. 202211124789.2, 202222460952.4, 202211125027.4, and 202222461735.7, all of which are filed on Sep. 15, 2022, and hereby incorporated by reference in their entireties.

FIELD OF THE INVENTION

This invention relates generally to fastening tools technology, and more particularly to a driving and controlling mechanism and nail gun having the same.

BACKGROUND OF THE INVENTION

The background description provided herein is for the purpose of generally presenting the context of the invention. The subject matter discussed in the background of the invention section should not be assumed to be prior art merely as a result of its mention in the background of the invention section. Similarly, a problem mentioned in the background of the invention section or associated with the subject matter of the background of the invention section should not be assumed to have been previously recognized in the prior art. The subject matter in the background of the invention section merely represents different approaches, which in and of themselves may also be inventions.

Nail gun is a fastening tool, commonly used in construction. Currently, one widely used type of nail gun is the electric nail gun powered by a lithium battery. This type of nail gun uses a lithium battery for power, which drives a motor and the corresponding driving and controlling mechanism to push the piston. The piston then compresses a power spring to store energy. When striking a nail, the stored energy in the power spring drives the piston, which in turn drives the striking member mounted on the piston to strike out the nail. For details, one can refer to the applicant's Chinese Patent No. CN215395034U, which is incorporated herein by reference in its entirety.

However, there are still some shortcomings in the aforementioned patent technology. For example, the driving and controlling mechanism uses a gear matching with a striking member having a groove to facilitate the energy storage of the power spring. Over prolonged use, the engagement between the gear and the groove is prone to wear and tear, teeth jamming, etc., leading to transmission issues or even causing the nail gun to jam completely, making it impossible for nail striking. Furthermore, it requires a separate circuit controller inside the nail gun to control the motor's operation, which results in higher costs.

Therefore, a heretofore unaddressed needs exist in the art for a nail gun that makes it easier for ordinary users to replace the striking member and has relatively fewer components.

SUMMARY OF THE INVENTION

In one aspect, this invention relates to a driving and controlling mechanism achieving a two stage energy storage phases and a nail gun having the same.

In one aspect of the invention, the driving and controlling mechanism comprises a driving assembly disposed inside a casing of the nail gun for striking nails in a striking direction; and a control assembly controlling the driving assembly; wherein the driving assembly comprises a piston movably disposed inside the casing and attached to a striking member for striking the nails; at least one power spring in contact with the piston; a pushing component for pushing the piston towards the power spring; and a motor for rotating the pushing component; wherein the control assembly comprises a main switch configured to produce a first electronic signal; and a safety switch configured to produce a second electronic signal; and wherein the main switch and the safety switch are in communication with the motor such that the motor is configured to operate when it receives both the first electronic signal and the second electronic signal.

In one embodiment, the main switch comprises a pressing part and a main switch component; the safety switch comprises a toggling part and a safety switch component.

In one embodiment, the toggling part comprises a toggle blade which is configured to contact an activation point of the safety switch component to generate the second electronic signal; a toggle rod having a first toggle rod end configured to contact the pushing component and a second toggle rod end configured to contact with the toggle blade to push it to disconnect from the activation point of the safety switch component; and a toggle blade seat having a toggle blade reset spring; a first end of the toggle blade reset spring is in contact with the toggle blade; and a second end of the toggle blade reset spring extends out of the toggle blade seat and is in contact with the toggle rod.

In one embodiment, the toggle blade is hook-shaped and comprises a contact plate for contacting the activation point of the safety switch component; a toggling plate for contacting the toggle rod; and a connecting plate connecting the contact plate and the toggling plate.

In one embodiment, the contact plate has a contact plate length which is shorter than a length of the toggling plate; and wherein a gap is formed by the difference between the contact plate length and the toggling plate length.

In one embodiment, the second electronic signal is generated when the activation point of the safety switch component touches the contact plate; and the second electronic signal is cut off when the activation point locates in the gap.

In one embodiment, the toggle rod comprises a first toggle rod disposed in adjacent to the pushing component; a second toggle rod disposed in adjacent to the toggle blade; a connecting section connecting the first and second toggle rods and is rotatably disposed in the casing via a toggle pin; and when the pushing component rotates and rubs against the first toggle rod, the second toggle rod pushes the toggle blade to move.

In one embodiment, the controlled driving assembly further comprises a crank assembly for pushing the toggle blade to interact with the safety switch component; the crank assembly comprises an external crank with its outer end extending out of a muzzle mechanism of the nail gun and its inner end inserted into the casing of the nail gun; and an internal crank with its outer end connected to the external crank and its inner end connected to the toggle blade seat; and a crank reset spring disposed adjacent to the internal crank outer end.

In one embodiment, the pushing component comprises a first pushing section and a second pushing section; the piston comprises a first pushed-end and a second pushed-end.

In one embodiment, the first pushed-end extends from the piston in the striking direction; and the second pushed-end extends from the piston towards the pushing component.

In one embodiment, the first pushing section is configured to push the first pushed-end; and the second pushing section is configured to push the second pushed-end.

In one embodiment, the first pushing section has a diameter larger than a diameter of the second pushing section.

In one embodiment, the pushing component further comprises a crank corner; the crank corner comprises a first crank arm on which the first pushing section is disposed, and a second crank arm on which the second pushing section is disposed; and the first crank arm and the second crank arm form a corner having degree less than 180 degree.

In one embodiment, the first pushing section and the second pushing section are cylindrical and are respectively disposed on an outer ends of the first crank arm and the second crank arm; and the first pushing section protrudes from an outer end of the first crank arm.

In one embodiment, the pushing component is installed on an output end of the motor; wherein a one-way rotating component is disposed between the pushing component and the output end of the motor.

In one embodiment, the one-way rotating component comprises a ratchet disposed on the output end of the motor; a ratchet claw disposed in adjacent to the ratchet and is configured to be received by at least one gap formed between more than one teeth of the ratchet; and a ratchet claw spring in contact with the ratchet.

In one embodiment, the nail gun further comprises a speed reducer disposed in connection with the output end of the motor and in connection with the one-way rotating component.

In one embodiment, when the pushing component rotates, the first pushing section pushes the first pushed-end causing the piston to move towards the power spring for a first period of time, achieving a first energy storage phase.

In one embodiment, when first energy storage phase is accomplished, the second pushing section pushes the second pushed-end causing the piston to move towards the power spring for a second period time, achieving a second energy storage phase.

In another aspect of the invention, the nail gun for striking nails in a striking direction comprises a casing having a cavity; a muzzle mechanism installed on a front end of the casing; a power source; and a driving and controlling mechanism as described above disposed in the cavity of the casing and connected to the power source for striking the nails in the striking direction.

These and other aspects of the invention will become apparent from the following description of the preferred embodiment taken in conjunction with the following drawings, although variations and modifications therein may be affected without departing from the spirit and scope of the novel concepts of the disclosure.

BRIEF DESCRIPTION OF THE DRAWINGS

The accompanying drawings illustrate one or more embodiments of the invention and together with the written description, serve to explain the principles of the invention. Wherever possible, the same reference numbers are used throughout the drawings to refer to the same or like elements of an embodiment.

DETAILED DESCRIPTION OF THE INVENTION

Figure 1:
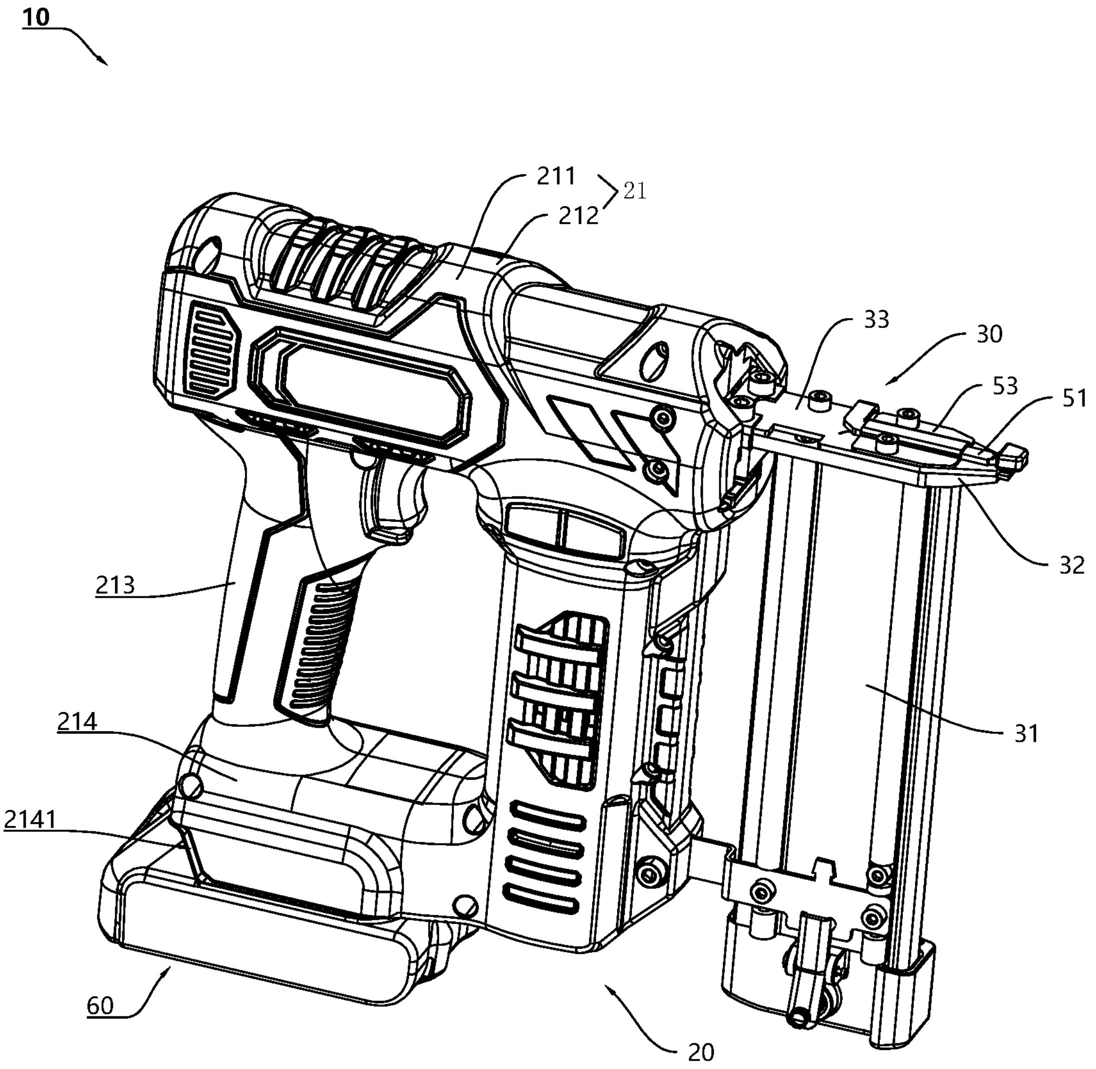
FIG. 1 is a schematic structural view of the nail gun according to one embodiment of the invention.

The invention will now be described more fully hereinafter with reference to the accompanying drawings, in which exemplary embodiments of the invention are shown. This invention may, however, be embodied in many different forms and should not be construed as limited to the embodiments set forth herein. Rather, these embodiments are provided so that this invention will be thorough and complete, and will fully convey the scope of the invention to those skilled in the art. Like reference numerals refer to like elements throughout.

The terms used in this specification generally have their ordinary meanings in the art, within the context of the invention, and in the specific context where each term is used. Certain terms that are used to describe the invention are discussed below, or elsewhere in the specification, to provide additional guidance to the practitioner regarding the description of the invention. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that same thing can be said in more than one way. Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and in no way limits the scope and meaning of the invention or of any exemplified term. Likewise, the invention is not limited to various embodiments given in this specification.

One of ordinary skill in the art will appreciate that starting materials, biological materials, reagents, synthetic methods, purification methods, analytical methods, assay methods, and biological methods other than those specifically exemplified can be employed in the practice of the invention without resort to undue experimentation. All art-known functional equivalents, of any such materials and methods are intended to be included in this invention. The terms and expressions which have been employed are used as terms of description and not of limitation, and there is no intention that in the use of such terms and expressions of excluding any equivalents of the features shown and described or portions thereof, but it is recognized that various modifications are possible within the scope of the invention claimed. Thus, it should be understood that although the invention has been specifically disclosed by preferred embodiments and optional features, modification and variation of the concepts herein disclosed may be resorted to by those skilled in the art, and that such modifications and variations are considered to be within the scope of this invention as defined by the appended claims.

Whenever a range is given in the specification, for example, a temperature range, a time range, or a composition or concentration range, all intermediate ranges and subranges, as well as all individual values included in the ranges given are intended to be included in the invention. It will be understood that any subranges or individual values in a range or subrange that are included in the description herein can be excluded from the claims herein.

It will be understood that, as used in the description herein and throughout the claims that follow, the meaning of “a”, “an”, and “the” includes plural reference unless the context clearly dictates otherwise. Thus, for example, reference to “a cell” includes a plurality of such cells and equivalents thereof known to those skilled in the art. As well, the terms “a” (or “an”), “one or more” and “at least one” can be used interchangeably herein. It is also to be noted that the terms “comprising”, “including”, and “having” can be used interchangeably.

It will be understood that when an element is referred to as being “on”, “attached” to, “connected” to, “coupled” with, “contacting”, etc., another element, it can be directly on, attached to, connected to, coupled with or contacting the other element or intervening elements may also be present. In contrast, when an element is referred to as being, for example, “directly on”, “directly attached” to, “directly connected” to, “directly coupled” with or “directly contacting” another element, there are no intervening elements present. It will also be appreciated by those of skill in the art that references to a structure or feature that is disposed “adjacent” another feature may have portions that overlap or underlie the adjacent feature.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of the invention.

Furthermore, relative terms, such as “lower” or “bottom” and “upper” or “top,” may be used herein to describe one element’s relationship to another element as illustrated in the figures. It will be understood that relative terms are intended to encompass different orientations of the device in addition to the orientation depicted in the figures. For example, if the device in one of the figures is turned over, elements described as being on the “lower” side of other elements would then be oriented on “upper” sides of the other elements. The exemplary term “lower”, can therefore, encompasses both an orientation of “lower” and “upper,” depending of the particular orientation of the figure. Similarly, if the device in one of the figures is turned over, elements described as “below” or “beneath” other elements would then be oriented “above” the other elements. The exemplary terms “below” or “beneath” can, therefore, encompass both an orientation of above and below.

It will be further understood that the terms “comprises” and/or “comprising”, or “includes” and/or “including”, or "has" and/or "having", or "carry" and/or "carrying", or "contain" and/or "containing", or "involve" and/or "involving", "characterized by", and the like are to be open-ended, i.e., to mean including but not limited to. When used in this disclosure, they specify the presence of stated features, regions, integers, steps, operations, elements, and/or components, but do not preclude the presence or addition of one or more other features, regions, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the invention, and will not be interpreted in an idealized or overly formal sense unless expressly so defined herein.

As used in the disclosure, "around", "about", "approximately" or "substantially" shall generally mean within 20 percent, preferably within 10 percent, and more preferably within 5 percent of a given value or range. Numerical quantities given herein are approximate, meaning that the term "around", "about", "approximately" or "substantially" can be inferred if not expressly stated.

As used in the disclosure, the phrase "at least one of A, B, and C" should be construed to mean a logical (A or B or C), using a non-exclusive logical OR. As used herein, the term "and/or" includes any and all combinations of one or more of the associated listed items.

The description below is merely illustrative in nature and is in no way intended to limit the invention, its application, or uses. The broad teachings of the invention can be implemented in a variety of forms. Therefore, while this invention includes particular examples, the true scope of the invention should not be so limited since other modifications will become apparent upon a study of the drawings, the specification, and the following claims. For purposes of clarity, the same reference numbers will be used in the drawings to identify similar elements. It should be understood that one or more steps within a method may be executed in different order (or concurrently) without altering the principles of the invention.

In accordance with the purposes of this invention, as embodied and broadly described herein, this invention, in certain aspects, relates to a driving and controlling mechanism and nail gun having the same. Embodiments of the invention are now described in conjunction with the accompanying drawings in FIGS. 1-21.

Embodiment 1

This invention proposes a driving and controlling mechanism which locates inside a casing of a nail gun This casing includes a handle for users to grip. This mechanism is designed to control and drive the shooting of nails.

In one embodiment, the driving and controlling mechanism includes a driving mechanism used to striking nails in the striking direction; a control assembly that governs the operations of the driving mechanism.

In one embodiment, the driving mechanism has a piston disposed inside the casing, equipped with a striking member for striking nails, at least one force spring applies power for the piston, a pushing component that pushes the piston towards the spring, allowing the spring to compress and store energy, a motor to turn the pushing component.

The control assembly has a main switch with a pressable part and primary switch component, a safety switch with a toggle part and safety switch component. The main switch, safety switch, and drive motor are electrically connected. When both main and safety switch components send an electrical signal, the drive motor operates.

In one embodiment, the toggle part that includes a toggle blade for making electrical contact with the safety switch, a toggle rod, and a toggle blade seat with a blade reset spring.

In one embodiment, the toggle blade designed as a hook with a contact plate, a toggling plate, and a connecting plate. The length of the contact plate is shorter than that of the toggling plate. The difference in their lengths forms a gap. When the activation point of the safety switch component contacts the contact plate, the safety switch component generates an electrical signal. When the activation point of the safety switch component is located in the gap, the safety switch component cuts off the electrical signal.

In one embodiment, the toggle rod includes a first toggle rod, disposed near the pushing component; a second toggle rod, disposed close to the toggle part.

In one embodiment, the toggle rod includes a connecting section, used to connect the first toggle rod and the second toggle rod, and set to rotate within the casing via a toggle pin. When the pushing component grazes the first toggle rod during its rotation, the second toggle rod touches and pushes the toggle part to move.

In one embodiment, the driving and controlling mechanism includes a crank assembly, used to drive the toggle part to interlock with the safety switch component. The crank assembly includes an outer crank, with the outer end extending to the outside of the nail gun muzzle mechanism and the inner end inserted into the nail gun body; an inner crank, with the outer end interlocking with the outer crank and the inner end combined with the toggle seat. Near the end of the inner crank that's close to the outer crank, there is a crank reset spring.

In one embodiment, the pushing component has a pushing section facing the piston. The piston is equipped with a pushed-end that matches the pushing section. This pushed-end may include a first pushed-end, extending from the piston in the direction of the nail's striking; a second pushed-end, extending from the piston towards the pushing component. The pushing section may include a first pushing section matching with the first pushed-end, and a second pushing section matching with the second pushed-end, with its outer diameter being smaller than that of the first pushing end.

In one embodiment, the pushing component also has a crank corner, which contains a first crank arm used to install the first pushing section; a second crank arm used to install the second pushing section, and is of equal length to the first crank arm. There's an angle formed between the first crank arm and the second crank arm.

In one embodiment, both the first pushing section and the second pushing section are cylindrical in shape, and they are respectively set at the outer ends of the first crank arm and the second crank arm. The outer ends of the first and second crank arms are arc-shaped, and the outer edge of the first pushing section protrudes from the outer end of the first crank arm.

In one embodiment, the pushing component is installed at the output end of the drive motor. Between the pushing component and this output end, there's a one-way rotation component. When the pushing component rotates under the drive of the motor, the first pushing section contacts and pushes the first pushed-end, causing the piston to move towards the power spring, allowing the power spring to store energy in its first phase. After completing the first phase of energy storage, the second pushing section contacts and pushes the second pushed-end, causing the piston to move towards the power spring, allowing the power spring to store energy in its second phase.

In one embodiment, the drive motor includes the motor body with an output shaft; a speed reducer mounted on the output shaft and having an output end for mounting the pushing component. The one-way rotating component includes: a ratchet with several ratchet teeth fitted on the output end; a pawl disposed on the side of the ratchet and used to insert into the ratchet teeth to make the ratchet rotate in one direction; and a pawl spring piece with one end mounted on the speed reducer and the other end resting on the pawl.

In one embodiment, a nail gun characterized by having at least a casing internally equipped with an installation chamber; a muzzle mechanism mounted at the front end of the casing; and a driving and controlling mechanism installed within the installation chamber. The driving and controlling mechanism is as described above.

Benefits & Effects of the Invention

The driving and controlling mechanism and nail gun of this invention, which incorporate the pushing component directly working with the piston, ensure smoother and more stable energy storage processes. There's no direct contact between the pushing component and the striking member, preventing movement interference in the piston. The control assembly, which includes the main switch, safety switch, and electric connection with the drive motor, employs a dual-switch, dual-safety design, ensuring safety during nail striking. The electrical signals of the safety switch are mechanically linked between the toggle blade, toggle rod, and pushing component. There's no need for additional pressure switches or controllers, offering a compact design, rapid linkage, effective control, and cost-effectiveness.

Embodiment 1-1

FIG. 1 is a schematic structural view of the nail gun according to one embodiment of the invention.

Figure 2A:
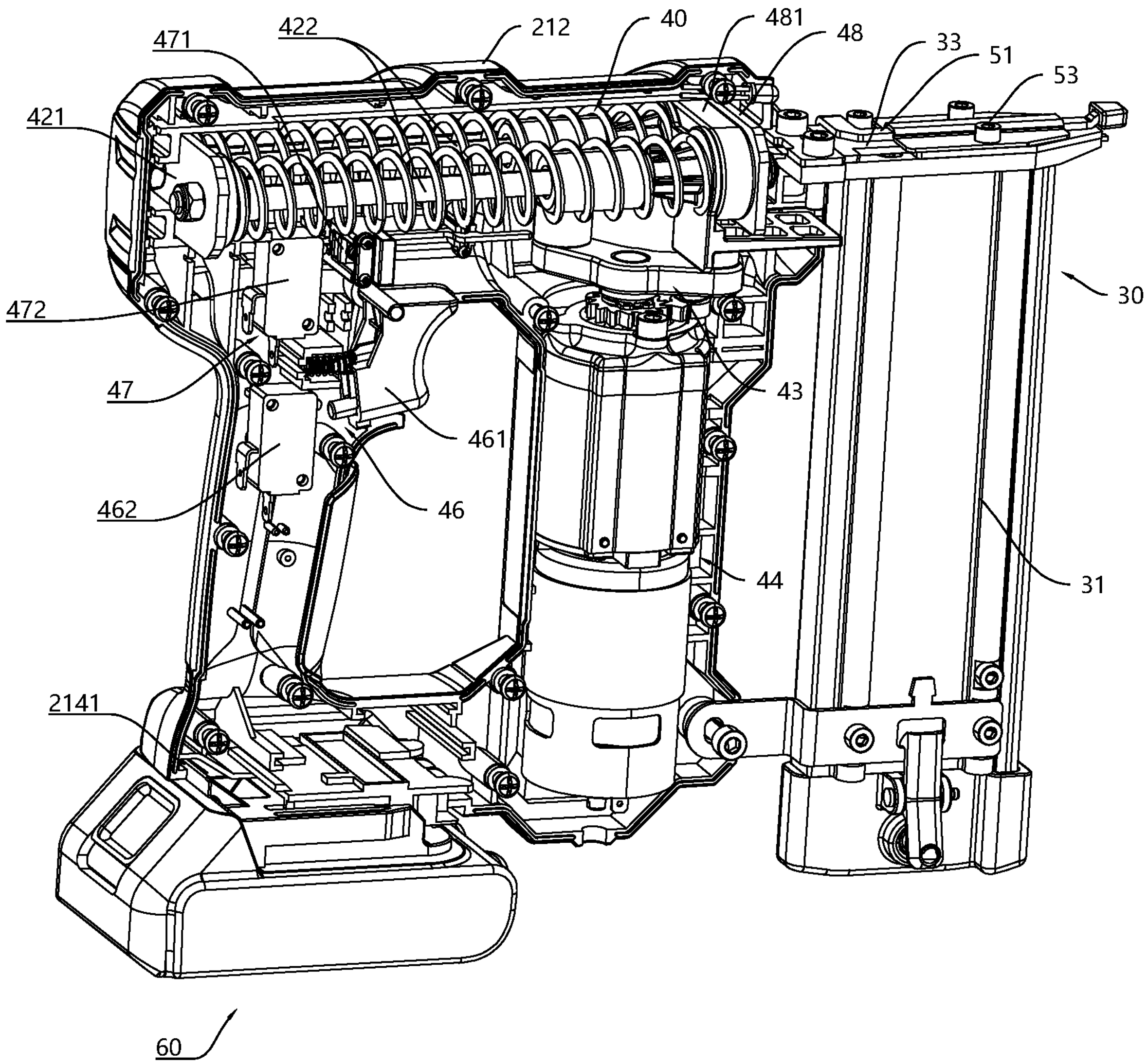
FIG. 2A is a schematic structural view of the nail gun with partial casing removed according to one embodiment of the invention.

FIG. 2A is a schematic structural view of the nail gun with partial casing removed according to one embodiment of the invention.

This embodiment provides a driving and controlling mechanism and a nail gun, which are easier to operate without compromising safety and nailing effects.

As shown in FIGS. 1 and 2A, the nail gun 10 of this embodiment includes a casing 20, a muzzle mechanism 30, a driving and controlling mechanism 40, and a power supply unit (lithium battery 60). The casing 20 is an external case 21, which is formed by coupling a front cover plate 211 with a rear cover plate 212, creating an internal cavity for installing the driving and controlling mechanism 40. The casing 21 not only accommodates internal components like the driving and controlling mechanism 40 but also protects them. The main casing 21 includes a handle 213 for users to grip and a casing base 214 connected to the handle. Both the handle 213 and the casing base 214 are hollow structures. An battery installation slot 2141 locates on the casing base 214 for the detachable installation of the lithium battery 60. The power supply unit powers the entire nail gun. The muzzle mechanism 30 is for storing nails and allowing them to be struck and shot. The driving and controlling mechanism 40 drives the striking member in a predetermined reciprocating movement, enabling it to strike nails from the muzzle mechanism 30.

Figure 3:
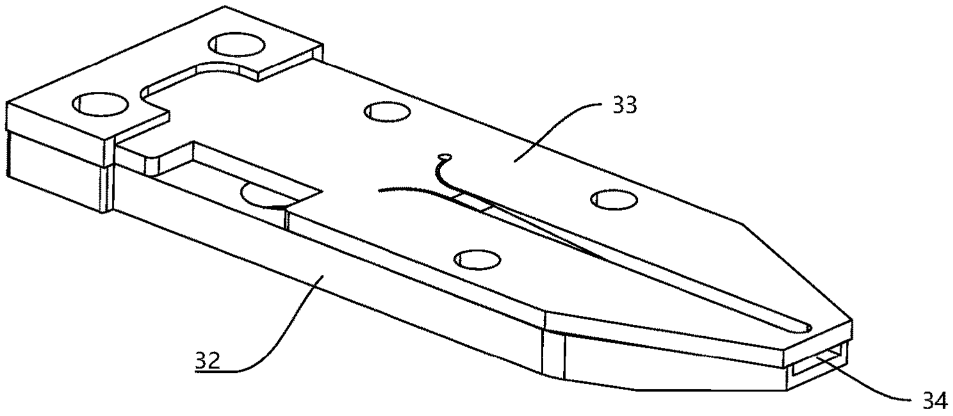
FIG. 3 is a partial structural diagram of a muzzle mechanism according to one embodiment of the invention.

FIG. 3 is a partial structural diagram of a muzzle mechanism according to one embodiment of the invention.

As depicted in FIGS. 2A and 3, the muzzle mechanism 30 is located at the front end of the casing 21. The muzzle mechanism 30 has a magazine 31 for holding nails, a muzzle member 32 installed at the top of the magazine, and a muzzle cover 33. A nail passage mechanism 34 locates between the muzzle member 32 and the muzzle cover 33, through which nails are shot out by the driving and controlling mechanism 40.

Figure 4A:
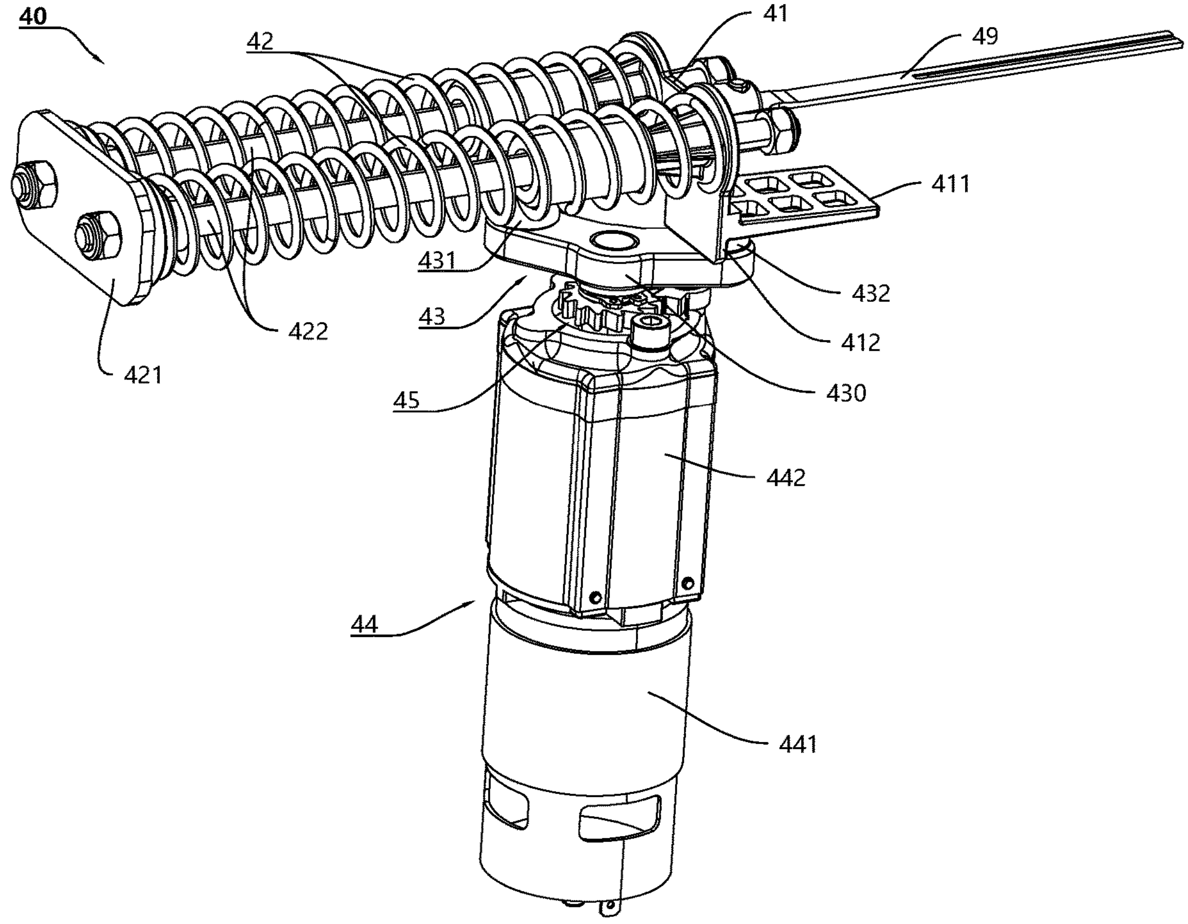
FIG. 4A is a schematic structural view of a driving and controlling mechanism according to one embodiment of the invention.

FIG. 4A is a schematic structural view of a driving and controlling mechanism according to one embodiment of the invention.

As shown in FIG. 4A, the driving and controlling mechanism 40 includes a driving assembly and a control assembly. The driving assembly drives the nails in the striking direction, while the control assembly manages its operation. The driving assembly has a piston 41 moving within the casing 20, at least one power spring 42, a pushing component 43, and a motor 44 that turns the pushing component 43.

As seen in FIG. 2A, an installation cavity inside the casing 21 has a slot structure. A cylinder head plate 48 is fixed at the front end (in this embodiment, the cylinder head plate 48 is plate-shaped), and a fixed plate 421 (also plate-shaped in this embodiment) is fixed at the rear end. A pair of parallel guide rods 422 are disposed between the cylinder head plate 48 and the fixed plate 421. The piston 41 is on the side of the guide rods 422 closer to the cylinder head plate 48, and the guide rods pass through the piston to affix to the cylinder head plate 48. A buffer pad 484 is disposed between the cylinder head plate 48 and the piston 41 to cushion collisions during the piston's movement. As shown in FIG. 4A, this embodiment has two parallel power springs 42, with the front end connected to the piston 41 and the rear end set against the fixed plate 421. Both power springs 42 are placed around the two guide rods 422. One end of each guide rod 422 is secured to the fixed plate 421 with a screw, and the other end passes through the piston 41 to fix onto the cylinder head plate 48. The guide rods 422 direct the piston 41 in its predetermined reciprocating movement.

The front end of the piston 41 is equipped with a striking member 49 to strike and shoot the nails. The rear end of the piston 41 interacts with the power spring 42. Driven by the power spring 42, it moves the piston 41 (i.e., the power spring 42 powers the movement of piston 41). The pushing component 43 has a pushing section directed towards the piston 41, which pushes the piston towards the end where the power spring 42 is located, thus compressing the spring for energy storage. Correspondingly, the piston 41 has a push-end that cooperates with the pushed-end, consisting of a first pushed-end 411 and a second pushed-end 412. The first pushed-end 411 extends from the piston 41 in the nail gun's striking direction, while the second pushed-end 412 extends towards the pushing component 43. The pushing section has a first pushing section 431 that interacts with the first pushed-end 411 and a second pushing section 432 that interacts with the second pushed-end 412. Both the first and second pushing sections, 431 and 432, are cylindrical in structure. As the pushing component 43 turns, it drives both the first and second pushing sections, 431 and 432, to turn. The diameter of the second pushing section 432 is smaller than that of the first pushing section 431, and its height is also shorter.

Figure 5A:
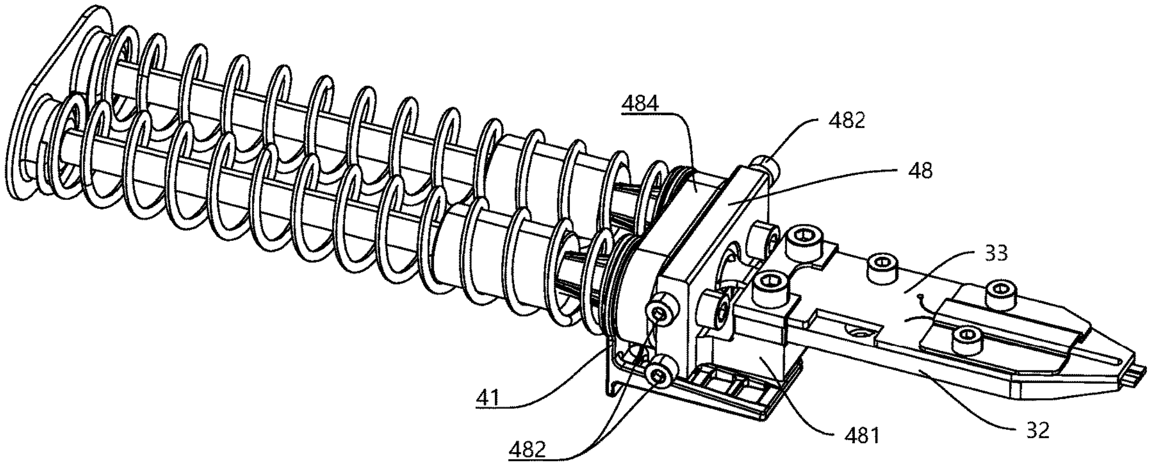
FIG. 5A is a schematic structural view of the muzzle mechanism according to one embodiment of the invention.

FIG. 5A is a schematic structural view of the muzzle mechanism according to one embodiment of the invention.

As shown in FIG. 5A, in one embodiment, the cylinder head plate 48 is positioned ahead of the piston 41 in the striking direction. Its lower end extends forward to form a mounting base plate 481. The muzzle member 32 and the muzzle cover 33 are mounted above this mounting base plate 481 using bolts. The front end of the striking member 49 in the middle of the piston 41 passes through the middle of the cylinder head plate 48 and is inserted into the nail passage 34 between the muzzle member 32 and the muzzle cover 33. The left and right sides of the cylinder head plate 48 are fixed to the casing 21 with mounting screws 482.

Figure 6A:
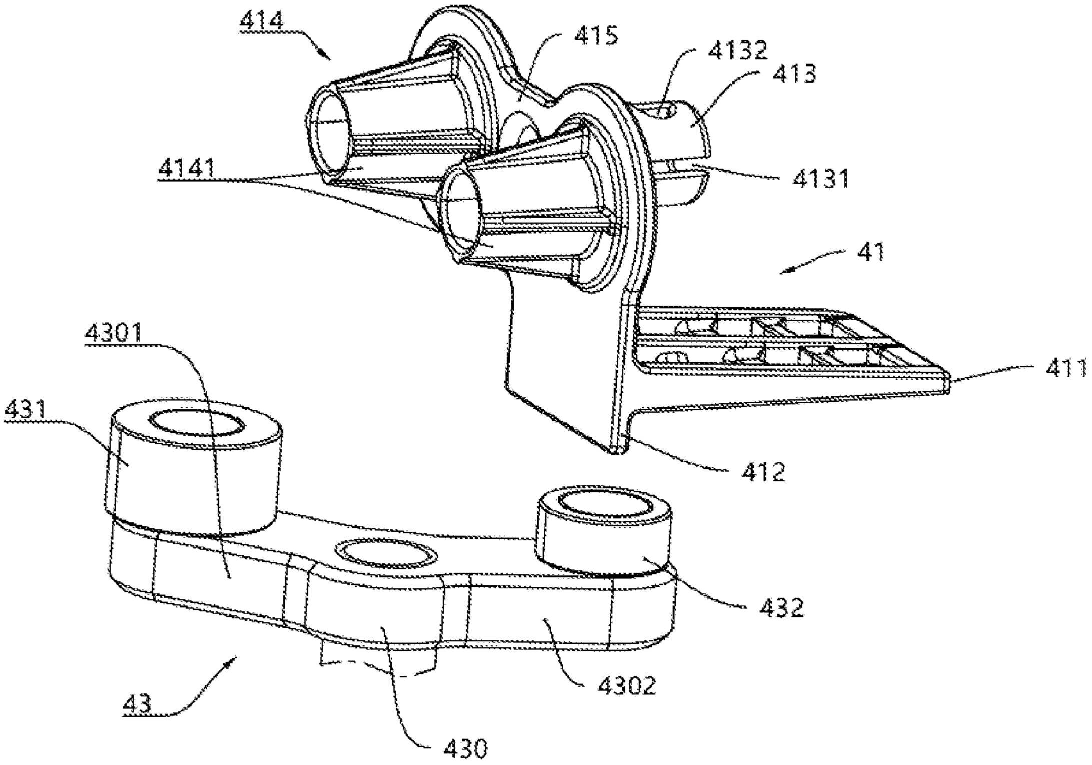
FIG. 6A is an exploded view of the piston and pushing component according to one embodiment of the invention.

FIG. 6A is an exploded view of the piston and pushing component according to one embodiment of the invention.

Figure 7:
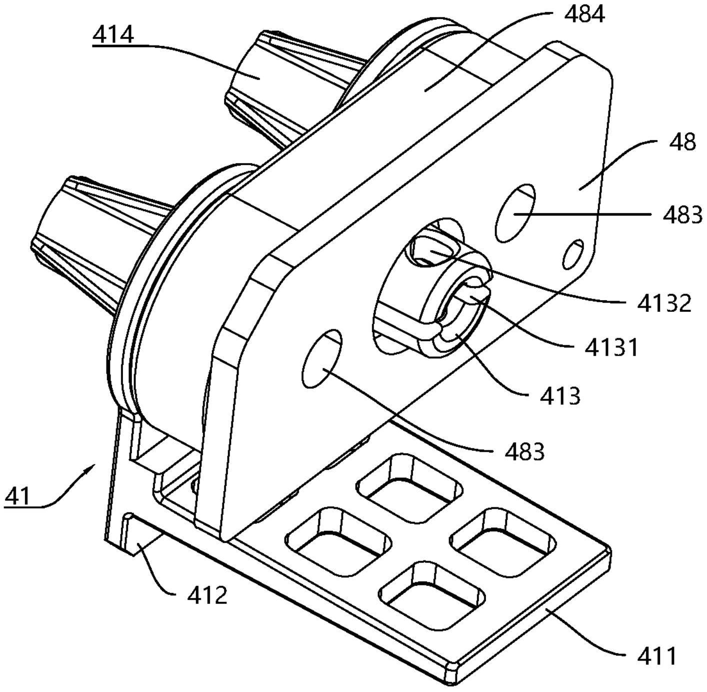
FIG. 7 is a schematic structural view of the piston and the cylinder head plate according to one embodiment of the invention.

FIG. 7 is a schematic structural view of the piston and the cylinder head plate according to one embodiment of the invention.

As shown in FIGS. 6A and 7, the piston 41 has a fixed part 413 used to secure the striking member 49. In one embodiment, the fixed part 413 as a whole is similar to a cylindrical shape, the middle of which has a straight slot 4131 axially and a fixing hole 4132 that passes radially through the entire cylinder. One end of the striking member 49 is inserted into the straight slot 4131 and is fixed in place using a pin that is inserted into the fixing hole 4132, thus fixing the striking member 49 onto the fixed part 413. The rear side of the fixed part 413 has an installation part 414 for installing the power spring 42. In one embodiment, this installation part 414 has two cone-shaped seats 4141 set for the power spring. Both of the installation seats 4141, the cylinder head plate 48, and the buffer pad 484 have through holes 483. The front ends of the two guiding rods 422 are fixed to the cylinder head plate 48 through the corresponding two through holes 483.

The fixed part 413 is connected to the installation part 414 via a plate-shaped connection part 415. The lower end of the connection part 415 extends downward (in the direction of the pushing component 43) to form a second pushed-end 412. One side of the second pushed-end 412 extends in the direction of the fixed part 413 to form the first pushed-end 411, and the second pushed-end 412 is approximately perpendicular to the first pushed-end 411. As shown in FIG. 7, in another embodiment, the cylinder head plate 48 is only a square plate-shaped structure, the muzzle mechanism is directly fixed to the casing 20, without the need to be fixed to the cylinder head plate 48. Instead, the muzzle member 32 is bolted directly to the casing 20.

Both the first pushing section 431 and the second pushing section 432 have a cylindrical structure. The pushing component 43 also has a crank corner 430, which consists of a first crank arm 4301 and a second crank arm 4302. The first pushing section 431 is installed at the outer end of the first crank arm 4301, and the second pushing section 432 is installed at the outer end of the second crank arm 4302. Both the first crank arm 4301 and the second crank arm 4302 are of equal length, forming an angle between them, and both their outer ends are arc-shaped. The outer rim of the first pushing section 431 protrudes beyond the outer end of the first crank arm 4301, while the outer rim of the second pushing section 432 is either flush with or slightly indented relative to the outer end of the second crank arm 4302.

As shown in FIG. 4A, the motor 44 includes a motor body 441 and a speed reducing mechanism 442. The speed reducing mechanism 442 is mounted on the output shaft of the motor body 441. The pushing component 43 is mounted on the output end of the speed reducing mechanism 442, and a one-way rotation component 45 is disposed between them. Under the drive of the motor body 441 and the speed reducing mechanism 442, the pushing component 43 rotates in one direction. The motor body 441 in this embodiment is a brushless motor. The speed reducing mechanism 442 is mounted on the output shaft of the motor body 441 to reduce the output speed of the motor body 441, thereby obtaining a higher output torque, i.e., a greater driving force. The one-way rotation component 45 restricts the rotation direction of the output end 443 of the motor 44 (i.e., the output shaft of the speed reducing mechanism 442), allowing it to rotate in only one direction. The one-way rotation component 45 is mounted on the output shaft of the speed reducing mechanism 442 and is synchronized to the output shaft, thus allowing the output shaft to rotate in only one direction. Meanwhile, when the pushing component 43 is subjected to a force that would cause it to rotate in the opposite direction, the one-way rotation component 45 bears this force, preventing it from being transmitted to the output shaft and thereby protecting the motor body 441. The specific structures of the motor body 441 and the speed reducing mechanism 442 adopt those found in existing technology. As shown in FIGS. 1, 2A, and 4A, the motor and the pushing component 43 are almost directly below the piston 41, making the whole structure more compact. The weight is concentrated in the middle of the entire nail gun, which compared to setting the motor and driving assemblies on the side, is more stable and evenly stressed and does not take up extra space.

During installation, a through hole is provided in the middle of the crank corner 430, located between the first crank arm 4301 and the second pushing section 432. The crank corner 430 is installed on the output end of the speed reducing mechanism 442 through this hole and can rotate with the motor body 441 and the speed reducing mechanism 442. Designing the pushing component 43 in the shape of the crank corner 430 is lighter compared to existing technologies that use structures like discs. This design not only saves materials but also reduces energy consumption, resulting in better transmission effects.

When the pushing component 43 rotates, its first pushing section 431 and second pushing section 432 will move in an arc with the crank corner 430 and will cooperate with the first pushed-end 411 and the second pushed-end 412 on the piston 41 to push the piston 41 in the energy storage direction. The shape and height of the first pushing section 431 correspond to the setting of the first pushed-end 411, and the shape and height of the second pushing section 432 correspond to the setting of the second pushed-end 412.

Figure 8:
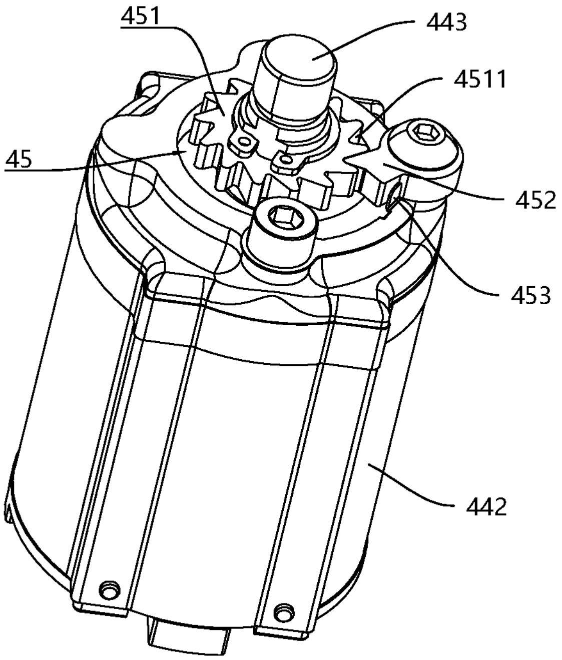
FIG. 8 is a schematic structural view of the one-way rotation component and the speed reducing mechanism according to one embodiment of the invention.

FIG. 8 is a schematic structural view of the one-way rotation component and the speed reducing mechanism according to one embodiment of the invention.

In one embodiment, the one-way rotation component can be a one-way bearing or a ratchet and pawl structure as shown in FIG. 8. The one-way bearing is a commonly used structure, so it won't be described in detail here. Instead, the present invention focuses on the ratchet and pawl structure in this embodiment. As shown in FIG. 8, the one-way rotation component 45 includes a ratchet 451, a pawl 452, and a pawl spring 453. The ratchet 451 is disposed on the output end 443 and has several ratchet teeth 4511. The pawl 452 is disposed on the speed reducer 442 next to the ratchet 451. The pawl 452 is used to insert between the teeth 4511 to make the ratchet 451 rotate in one direction. One end of the pawl spring 453 is fixed to the speed reducer 443 with a bolt, and the other end rests on the pawl 452, ensuring it always tends to move towards and insert into the teeth 4511.

Figure 9A:
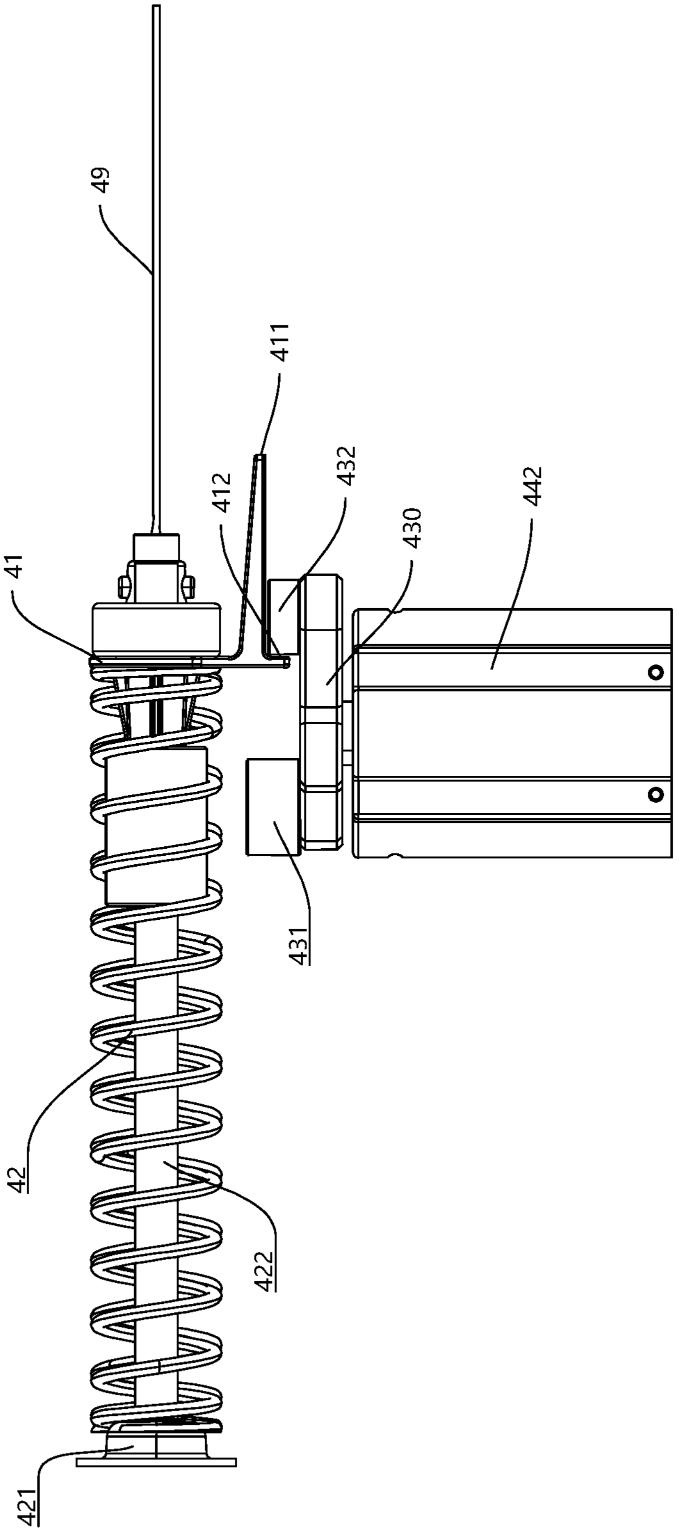
FIG. 9A illustrates a process the pushing component interacts and drives the piston at a first position according to one embodiment of the invention.

FIG. 9A illustrates a process the pushing component interacts and drives the piston at a first position according to one embodiment of the invention.

Figure 10A:
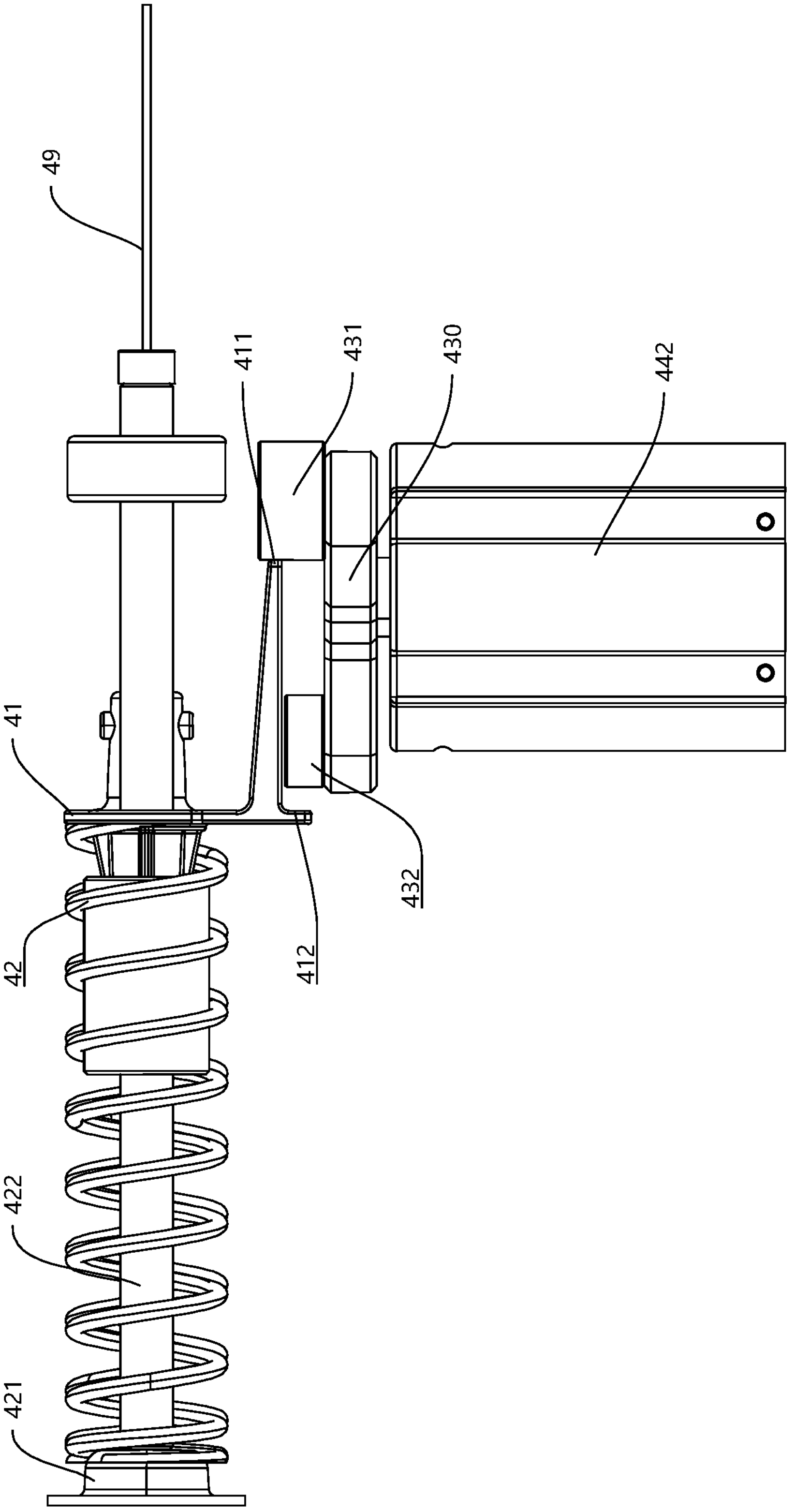
FIG. 10A illustrates a process the pushing component interacts and drives the piston at a second position according to one embodiment of the invention.

FIG. 10A illustrates a process the pushing component interacts and drives the piston at a second position according to one embodiment of the invention.

FIGS. 9A and 10A show the interaction between the driving and controlling mechanism 43 and the piston during the piston movement process. As depicted, under the drive of the motor body 441, the pushing component 43 rotates clockwise. With its rotation, the second pushing section 432 moves to the second pushed-end 412, and they get in contact with each other. The pushing component 43 continues to rotate, and the second pushing section 432 moves in an arc towards the energy storage direction, applying an arcing force to the piston 41 through the second pushed-end 412. This causes the piston 41 to move along the guide rod 422 in the energy storage direction, compressing the power spring 42 for energy storage. When the second pushing section 432 rotates to its maximum stroke in the energy storage direction, the first phase of energy storage is completed. The pushing component 43 continues to rotate, with the second pushing section 432 subsequently disengaging from the second pushed-end 412. Simultaneously, the first pushing section 431 rotates to meet the first pushed-end 411. It then pushes the piston 41 further in the energy storage direction until the first pushing section 431 rotates to its maximum stroke, completing the second phase of energy storage and the entire spring energy storage process accomplished. In one embodiment, after the second phase of energy storage, nailing is carried out. During nailing, the motor body 441 drives the pushing component 43 to continue rotating, and the first pushing section 431 disengages from the first pushed-end 411. At this point, both the first and second pushed-ends are out of the piston's path, allowing the piston 41 to move in the nail striking direction under the force of the power spring 42. This continues until the striking member 49 hits the nail, completing the nailing process. During the above-mentioned first or second phase of energy storage, the crank corner 430, due to the one-way bearing, will not rotate in reverse under the force of the piston 41, preventing accidental shooting of the nails.

The motor body 441 drives the pushing component 43, which in turn pushes the piston 41. This action causes the power spring 42 to be compressed for energy storage, and finally, the piston 41 is pushed out under the force of the power spring 42.

Figure 11:
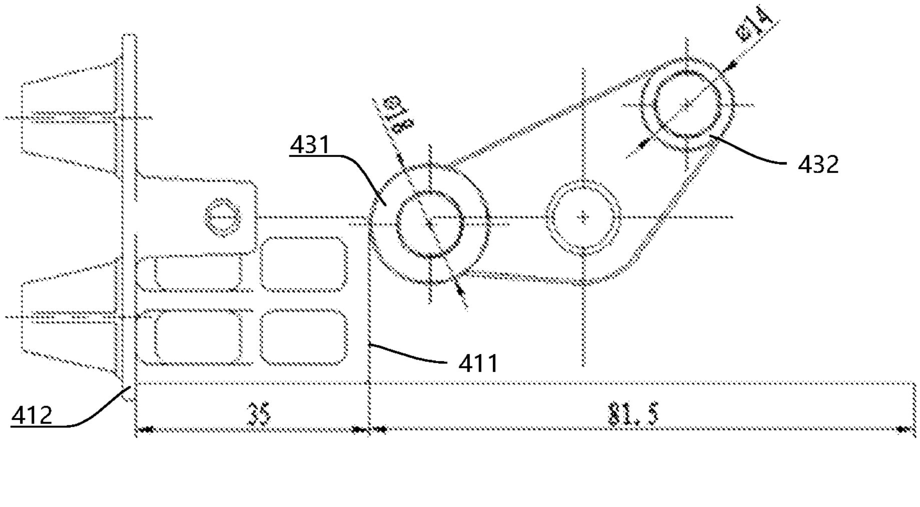
FIG. 11 is a cross section view of the piston and the pushing component in contact with each other according to one embodiment of the invention.

FIG. 11 is a cross section view of the piston and the pushing component in contact with each other according to one embodiment of the invention.

Figure 12:
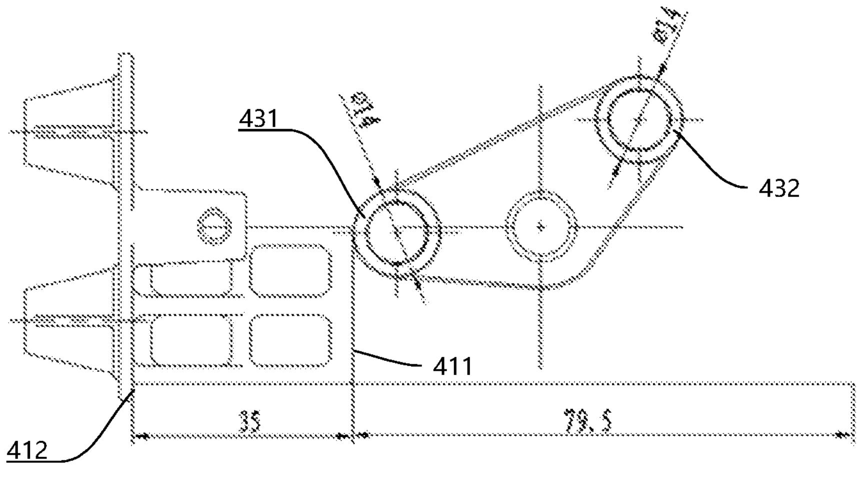
FIG. 12 is a cross section view of the piston and the pushing component in contact with each other according to a control design.

FIG. 12 is a cross section view of the piston and the pushing component in contact with each other according to a control design.

In this embodiment, both the first pushing section 431 and the second pushing section 432 are cylindrical. The external diameter of the second pushing section 432 is designed to be smaller than that of the first pushing section 431, and they are not equal. This design can enlarge the piston's stroke compared to having equal external diameters. An experiment showed in FIGS. 11-12, in this embodiment, the external diameter of the first pushing section 431 is 18 mm (radius 9 mm), and the external diameter of the second pushing section 432 is 14 mm (radius 7 mm). The distance between the first pushed-end 411 and the second pushed-end 412 of the piston is 35 mm, and the experimental working stroke achieved is 81.5 mm. In contrast, as shown in FIG. 12, in the control group of this embodiment, the external diameters of the first pushing section 431 and the second pushing section 432 are both 14 mm (radius 7 mm). The distance between the first and second pushed-ends of the piston is 35 mm, and the experimental working stroke achieved is 79.5 mm, clearly less than the stroke achieved in this embodiment.

The calculations for the above work mode are as follows.

The working stroke is represented as S. The distance between the first pushed-end and the second pushed-end of the piston is L. The angle between the first pushing section 431 and the second pushing section 432 is denoted as n (that is, the angle between the first crank arm 4301 and the second pushing section 432). The formula for calculating the arc length traversed by the rotation of the first pushing section 431 and the second pushing section 432 is: $1=n\pi R/180^\circ$. When the first pushing section 431 and the second pushing section 432 have the same diameter (both with a radius of R), the working stroke of the piston is $S=L+1=L+)(n\pi R/180^\circ$. When the first pushing section 431 and the second pushing section 432 have different diameters (with radii R1 and R2 respectively), the working stroke is $S=L+1+(R1-R2)$. It is evident that when the diameters are not equal, the piston's working stroke is longer by a distance of $(R1-R2)$ compared to when the diameters are equal. This means that by adjusting the diameter of the pushing section without changing the length of the piston's pushed-ends, it is possible to achieve the maximum working stroke. The greater the working stroke, the more the power spring 42 is compressed, thereby obtaining a greater energy, allowing for a more forceful and rapid striking of the nail. Additionally, since the nail gun structure needs to be compact, it is ideal to minimize the design length of the nail gun, which is also beneficial for operation, packaging, and transportation.

As shown in FIG. 2A, the driving and controlling mechanism 40 also includes a control assembly, which includes a main switch 46 and a safety switch 47. They are connected in series to the lithium battery 60 and the motor body 441. When both the main switch 46 and the safety switch 47 have an electric signal, the motor body 441 can be controlled to operate. The main switch 46 is a button-type switch with a pressing part 461 and a main switch component 462. The main switch component 462 can generate a corresponding startup electric signal when the pressing part 461 is pressed. The safety switch 47 is a linkage-type switch with a toggle part 471 and a safety switch component 472. The safety switch component 472 can generate an electric signal when it contacts the toggle part 471. In this embodiment, both the main switch component 462 and the safety switch component 472 use microswitches. When both components generate an electric signal, the motor body 441 operates, driving the pushing component 43 to rotate and complete the aforementioned spring energy storage process.

Figure 13A:
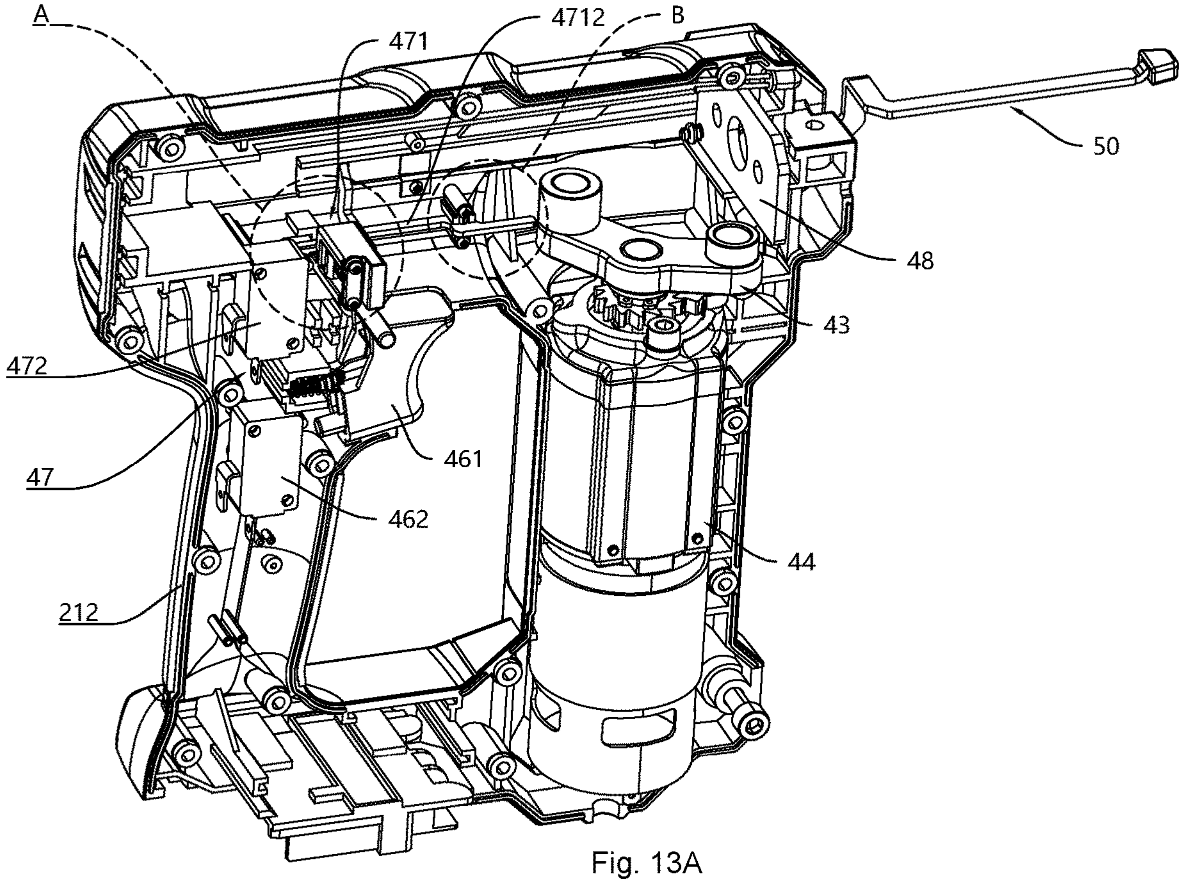
FIG. 13A is a schematic structural view of a safety switch installed inside the casing according to one embodiment of the invention.

FIG. 13A is a schematic structural view of a safety switch installed inside the casing according to one embodiment of the invention.

Figure 14A:
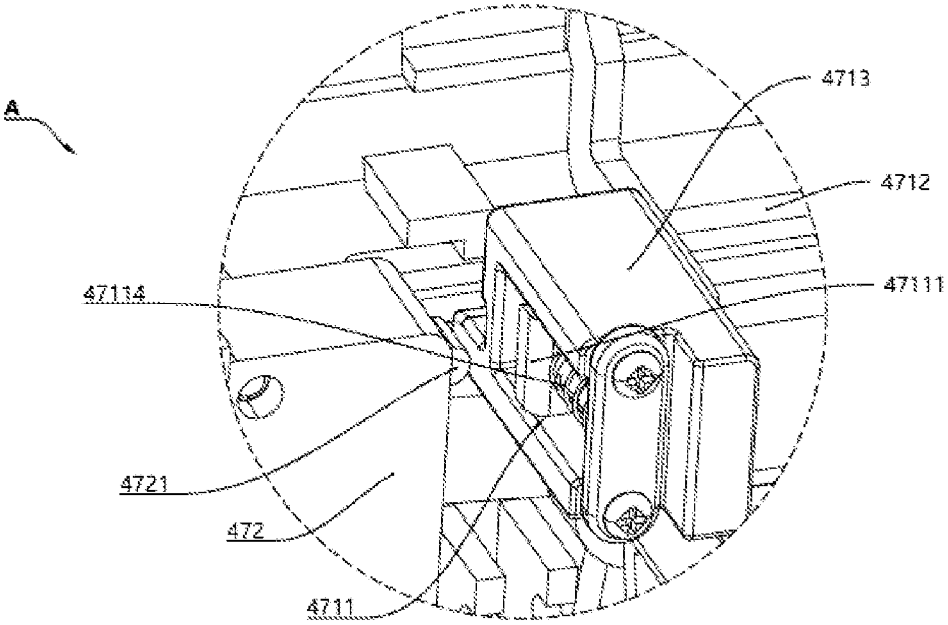
FIG. 14A is an enlarged view of the part A in FIG. 13A.

FIG. 14A is an enlarged view of the part A in FIG. 13A.

Figure 15:
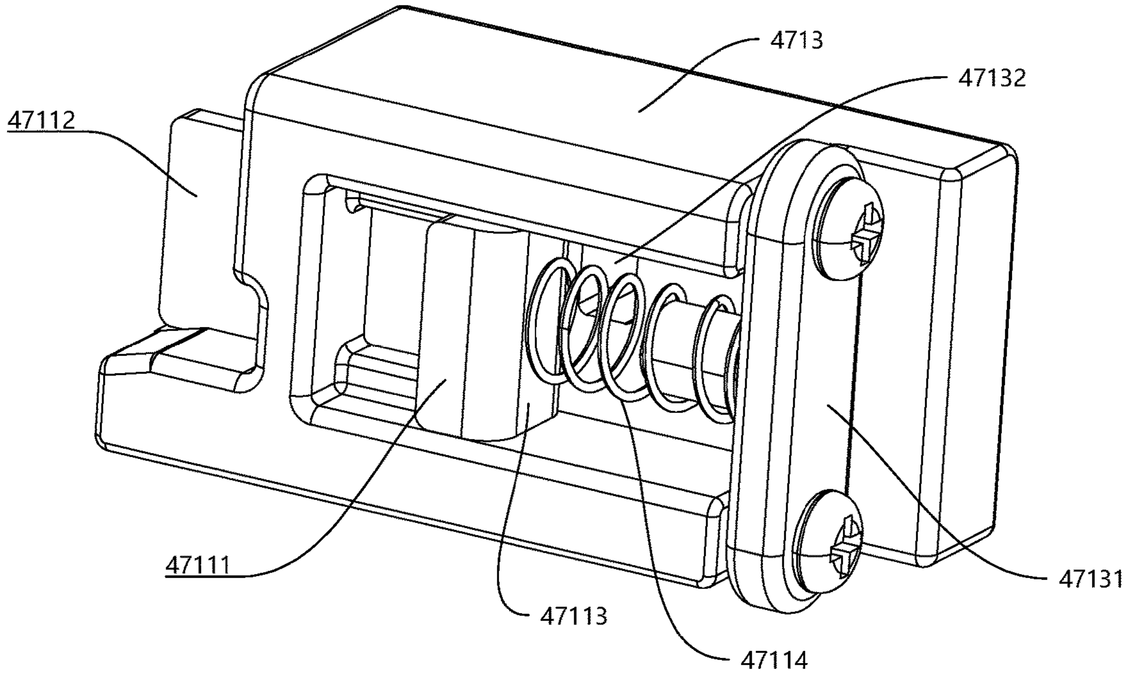
FIG. 15 is a schematic structural view of the toggle part installed inside the toggle base according to one embodiment of the invention.

FIG. 15 is a schematic structural view of the toggle part installed inside the toggle base according to one embodiment of the invention.

Figure 16:
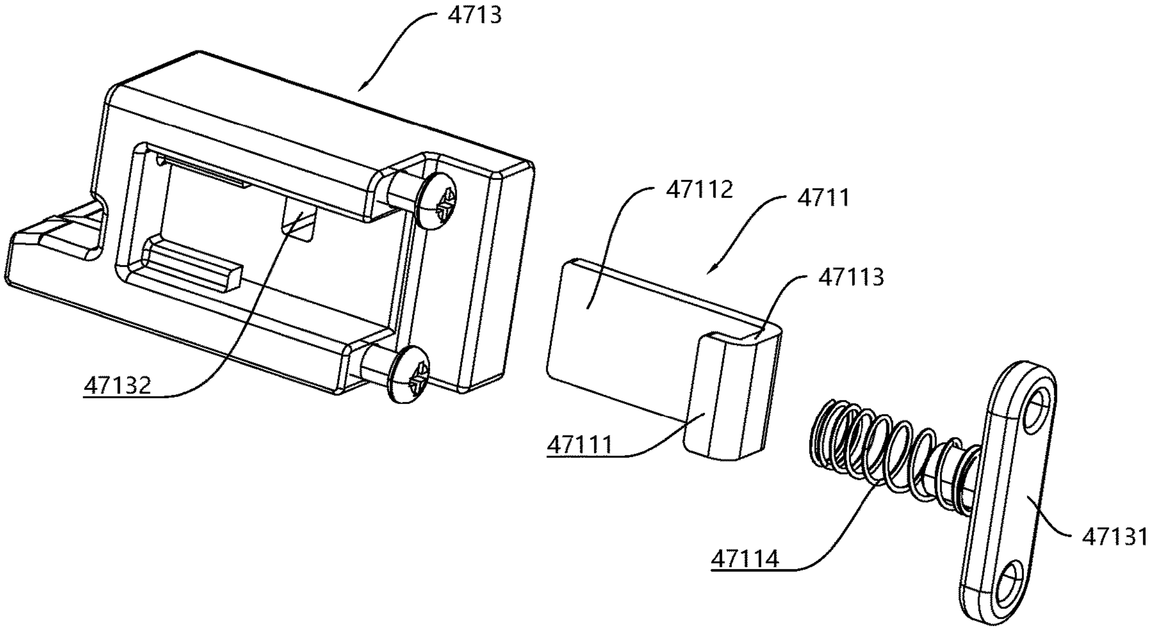
FIG. 16 is an exploded view of the toggle part and the toggle base according to one embodiment of the invention.

FIG. 16 is an exploded view of the toggle part and the toggle base according to one embodiment of the invention.

As shown in FIGS. 13A, 14A,-16, the toggle part 471 of the safety switch 47 consists of a toggle blade 4711, a toggle rod 4712, and a toggle blade seat 4713 for mounting the toggle blade 4711. The toggle blade 4711 is on one side of the safety switch component 472 and interacts with it. The interaction mode is such that one side of the safety switch component 472 has an activation point 4721. The toggle blade 4711, in a hook shape, is mounted on the toggle blade seat 4713 and comprises a contact plate 47111, a toggling plate 47112, and a connecting plate 47113 that connects the contact plate 47111 with the toggling plate 47112. The contact plate 47111 is disposed to face the activation point 4721 of the safety switch component 472 for contact. When the activation point 4721 contacts the contact plate 47111, an electrical signal will be generated in the safety switch component. The outer end of the toggling plate 47112 extends out of the toggle blade seat 4713 to contact the toggle rod 4712. The length of the contact plate 47111 is shorter than that of the toggling plate 47112, resulting in a gap. When pushed by the toggle rod 4712, the toggling plate 47112 will move towards the toggle blade seat 4713, causing the contact plate 47111 to move and gradually separate from the activation point 4721. When the activation point 4721 is in the gap, the safety switch component 472 will break the electrical connection. To reset the toggle blade 4711, a toggle spring seat 47131 is disposed on the toggle blade seat 4713. A toggle blade reset spring 47114 is installed against the connecting plate 47113 of the toggle blade 4711.

Figure 17A:
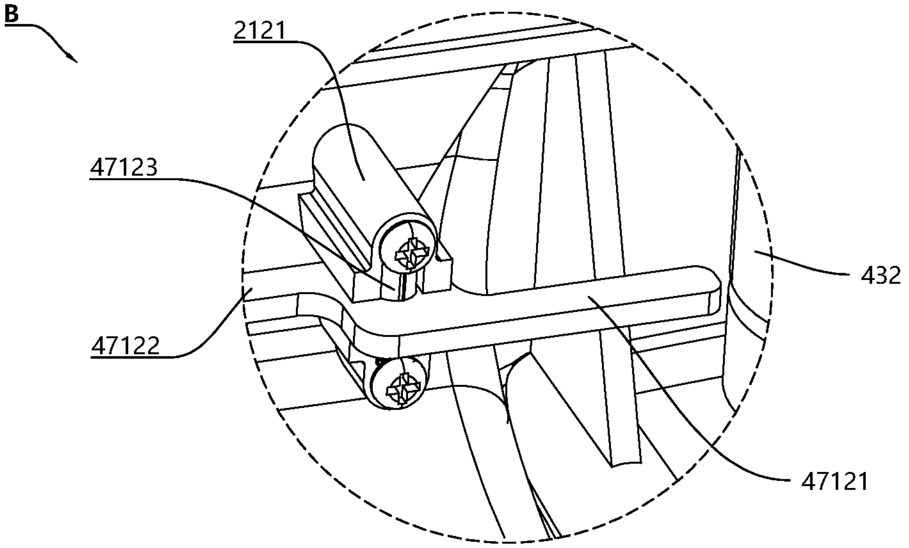
FIG. 17A is an enlarged view of the part B in FIG. 13A.

FIG. 17A is an enlarged view of the part B in FIG. 13A.

The toggle rod 4712 is a long rod bent at one end and is used to control the movement of the toggle blade 4711. Specifically, the toggle rod 4712 includes a first toggle rod 47121 and a second toggle rod 47122. The end of the first toggle rod 47121 is set near the pushing section of the driving assembly 43 and will collide (scrape) during the rotation of the pushing section. The end of the second toggle rod 47122 is on the inside of the toggle blade 4711. The connection section where the first toggle rod 47121 and the second toggle rod 47122 are joined has a toggle pin 47123. A protrusion inside the rear cover plate 212 of the casing 20 provides a toggle rod installation position 2121 for the toggle pin 47123. The toggle rod 4712 is rotatably mounted at the toggle rod installation position 2121 through this toggle pin 47123. In this embodiment, the first toggle rod 47121 and the second toggle rod 47122 are staggered, meaning they are not in line. The entire toggle rod 4712 is Z-shaped. The length of the first toggle rod 47121 is shorter than the second toggle rod 47122. Using the lever principle, once the first toggle rod 47121 is scraped by the pushing section, the second toggle rod 47122 will rotate in the opposite direction, touching and pushing the toggle blade 4711. This staggered design allows the first toggle rod 47121 to have enough space during rotation and ensures the second toggle rod 47122 can obtain the required stroke when pushing the toggle blade 4711.

Figure 18A:
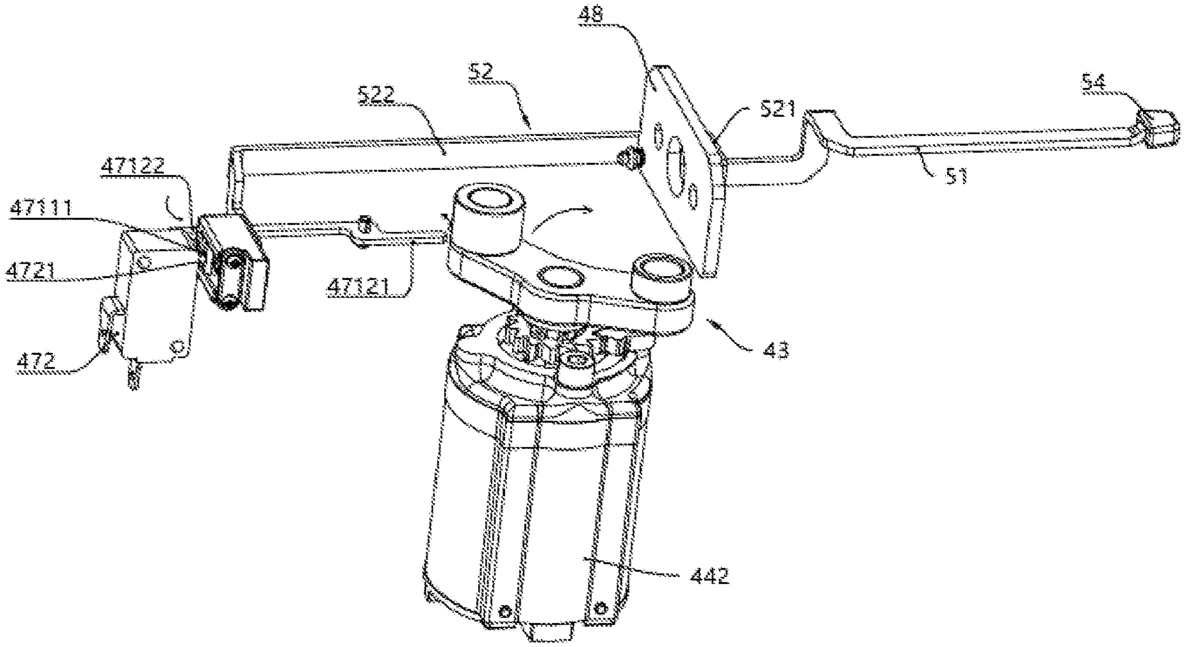
FIG. 18A is one of the schematic diagrams showing the installation position of the safety switch and the crank mechanism according to one embodiment of the invention.

FIG. 18A is one of the schematic diagrams showing the installation position of the safety switch and the crank mechanism according to one embodiment of the invention.

As shown in FIG. 18A, at this time, the safety switch component 472 is in a state with an electrical signal, i.e., the activation point 4721 contacts the contact plate 47111 of the toggle blade 4711. When the pushing section of the driving assembly 43 rotates clockwise, once it scrapes the first toggle rod 47121, it will cause the first toggle rod 47121 to rotate inward. According to the lever principle, the second toggle rod 47122 will rotate outward, touch the toggling plate 47112 of the toggle blade 4711, and push the toggle blade 4711 to move outward. This will cause the contact plate 47111 to leave the activation point 4721. At this time, the safety switch component 472 will disconnect the electrical signal, and the drive motor will immediately stop working.

Because there is a toggle reset spring 47114 between one side of the toggle blade 4711 and the toggle blade seat 4713, when there is no contact between the pushing section and the first toggle rod 47121, the toggle reset spring 47114 will push the toggle blade 4711 back to its original position. The first toggle rod 47121 and the second toggle rod 47122 will also reset in sequence. The outer side of the first toggle rod 47121 can be set with an inclined guiding surface 471211, making it more convenient for the pushing section to collide with the first toggle rod 47121 during rotation.

Figure 19:
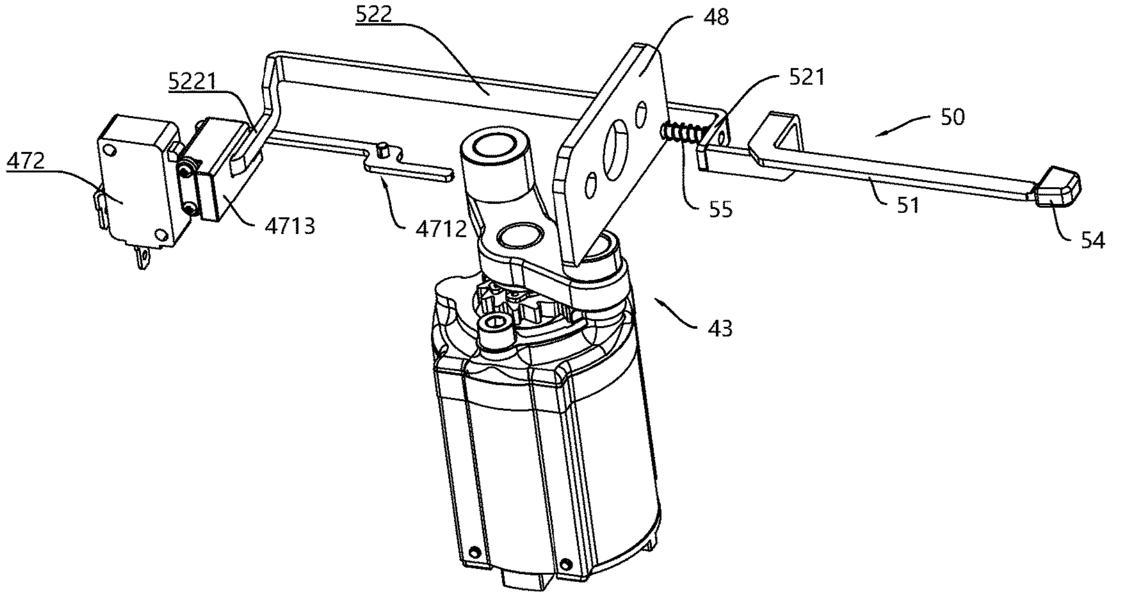
FIG. 19 is a second schematic diagram showing the installation position of the safety switch and the crank mechanism according to one embodiment of the invention.

FIG. 19 is a second schematic diagram showing the installation position of the safety switch and the crank mechanism according to one embodiment of the invention.

The driving and controlling mechanism 40 includes a crank assembly 50, which is designed to promote the linkage between the toggle blade 4711 and the safety switch component 472. The crank assembly 50 includes an outer crank 51 and an inner crank 52. As depicted in FIGS. 1 and 2A, the external end of the crank 51 extends out of the casing 20 and is attached to the muzzle cover plate 33 of the muzzle mechanism via a pressure plate 53. The external end protrudes from the muzzle mechanism, and the internal end of the outer crank 51 is linked with the inner crank 52 inside the casing 20. As shown in FIGS. 18A and 19, the inner crank 52 has a short section 521 and a long section 522, set perpendicular to each other. The external side of the short section 521 contacts the internal end of the outer crank 51. The long section 522 extends near the toggle blade seat 4713 and bends towards the toggle blade seat 4713, forming a contact section 5221. The toggle blade seat 4713 has a hole 47132 into which the end of the contact section 5221 is inserted, connecting it with the toggle blade seat 4713.

The linkage between the crank assembly 50 and the safety switch component 472 works as follows.

During the nail gun's use, the muzzle mechanism, located at the front, is first aligned with the target area to be nailed. Since the external end of the crank 51 protrudes from the muzzle mechanism, when it touches the target area, it generates a reactionary force on the outer crank 51, causing it to move toward the side of the nail gun. The internal end of the outer crank 51 will touch the short section 521 of the inner crank 52, pushing the inner crank 52 inward. As the outer crank 51 moves, it also drives the toggle blade seat 4713 towards the safety switch component 472. This causes the contact plate 47111 on the toggle blade 4711 inside the toggle blade seat 4713 to touch and press the activation point 4721 of the safety switch component 472, generating an electrical signal. Then, when the user presses the pressing section 461, the main switch component 462 is activated, creating another electrical signal. When both switch components are activated, the motor body 441 starts, allowing the power spring to store energy before striking the nail.

As shown in FIG. 19, a crank reset spring 55, designed to reset the crank assembly, is positioned between the short section 521 of the inner crank 52 and the cylinder head seat 48. After nailing is complete and the user removes the nail gun, the external end of the outer crank 51 separates from the target area. At this point, the crank reset spring 55 drives both the inner crank 52 and the outer crank 51 to reset. The external end of the outer crank 51 also has a protective cover 54, which when in contact with the target area, reduces wear on the external end of the crank 51, extending its lifespan.

Working Principle of Embodiment 1-1

When using the nail gun, the front-facing muzzle mechanism is first aligned with the target nailing area. The outer crank 51 is pushed, causing the inner crank to drive the toggle blade seat toward the safety switch component 472, activating it to produce an electrical signal. Then, the user activates the main switch component 462 to create another electrical signal. At this point, since both the main and safety switches generate electrical signals, the motor body 441 starts, driving the drive component 43 to rotate. The drive component 43, during its rotation, causes the piston 41 to move toward the power spring 42, compressing it and storing energy in two stages. After the second energy storage stage is complete, nailing can commence. During nailing, the motor body 441 continues to drive the drive component 43 to rotate. The first drive end 431 rotates, disengaging from the first pushed-end 411. At this point, both the first pushing section 431 and the second pushing section 432 are outside the movement path of the piston 41. The piston 41, under the force of the power spring 42, moves in the direction of nailing until the striking member 49 strikes the nail, shoot it out, completing the nailing process. Simultaneously, because the outer rim of the first pushing section 431 protrudes, as it rotates, it will scrape against the first toggle rod 47121, prompting the first toggle rod 47121 to rotate inward. This pushes the second toggle rod 47122 outward, touching the toggle blade 4711 and moving it outward, causing the contact plate 47111 to separate from the activation point 4721.

Embodiment 1-2

Figure 20:
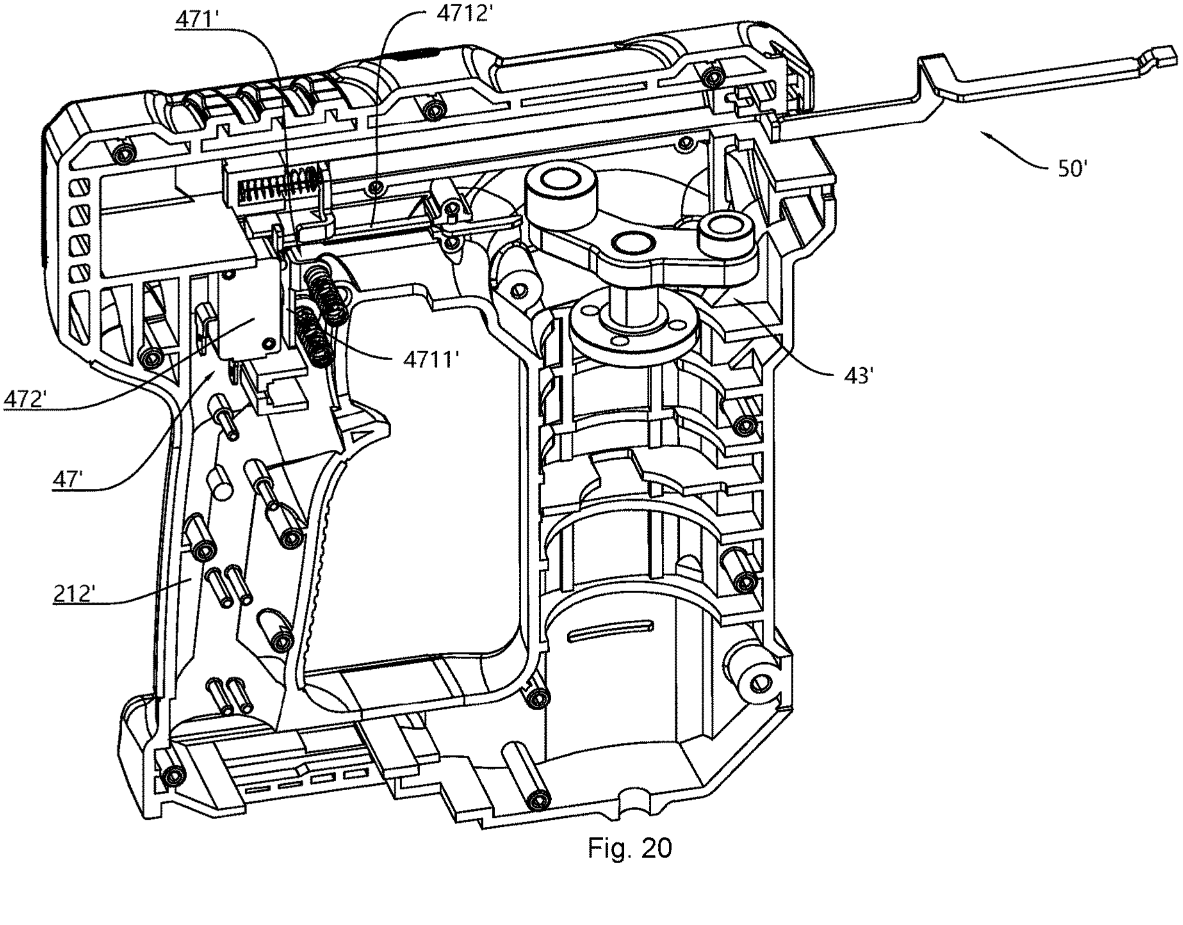
FIG. 20 is a schematic structural view of the safety switch installed inside the casing according to another embodiment of the invention.

FIG. 20 is a schematic structural view of the safety switch installed inside the casing according to another embodiment of the invention.

Figure 21:
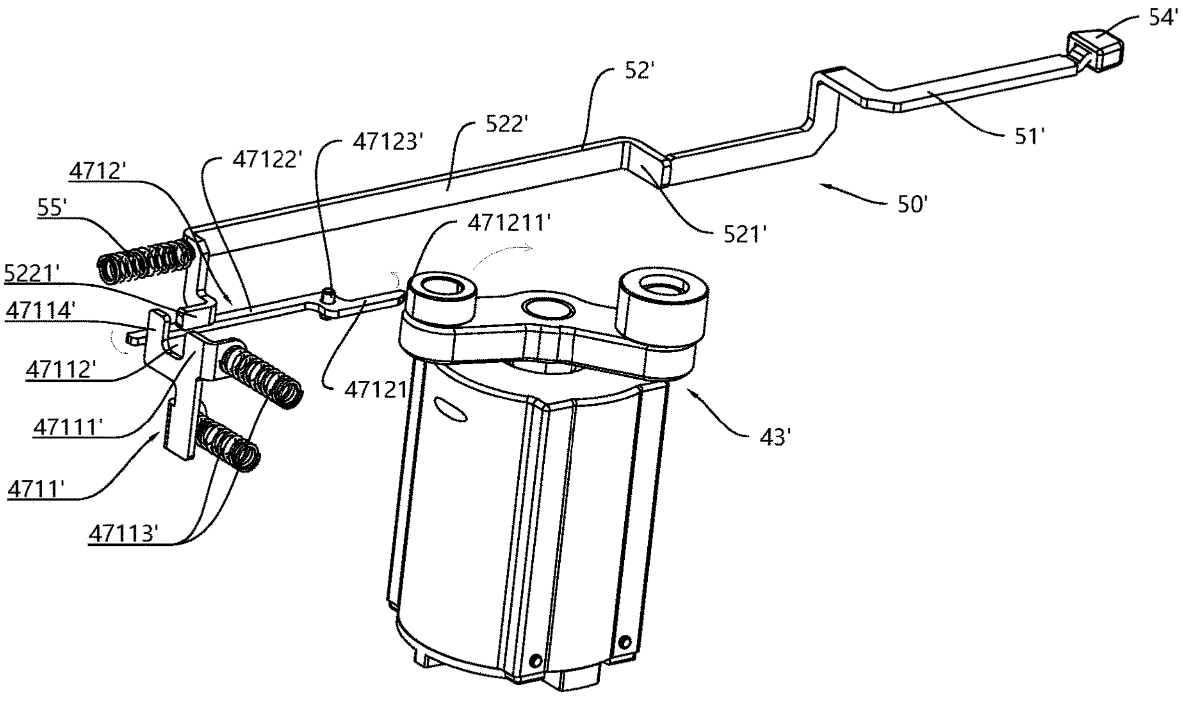
FIG. 21 is a schematic structural view showing the installation position of the safety switch and the crank mechanism according to another embodiment of the invention.

FIG. 21 is a schematic structural view showing the installation position of the safety switch and the crank mechanism according to another embodiment of the invention.

As shown in FIG. 20, the toggle part 471' of safety switch 47' includes a toggle blade 4711' and a toggle rod 4712'. The toggle blade 4711' is located on one side of the safety switch component 472' and is linked to it. The linking method is as follows: One side of the safety switch component 472' has a protruding switch 4721'. On the toggle blade 4711', there is a trigger end 47111'. When the trigger end 47111' touches the protruding switch 4721', it triggers the safety switch component 472' to open and produce an electric signal. Next to the trigger end 47111', there's a trigger slot 47112'. When the toggle blade 4711' moves, the trigger end 47111' departs from the protruding switch 4721', and once the protruding switch 4721' aligns with the trigger slot 47112', the safety switch component 472' disconnects the electric signal.

As shown in FIG. 21, the toggle rod 4712' is a long rod with one bent end, used to control the movement of the toggle blade 4711'. Specifically, the toggle rod 4712' has a first toggle rod 47121' and a second toggle rod 47122'. The end of the first toggle rod 47121' is close to the pushing component 43' and will collide with it during rotation. The end of the second toggle rod 47122' is located on the inner side of the toggle blade 4711'. The connecting section between the first and second toggle rods has a toggle pin 47123'. The rear cover 212' of the casing has a protruding section where the toggle pin 47123' is installed. The toggle rod 4712' is pivotally mounted at this location. (The structure of the toggle rod and its installation in the casing is the same as in Embodiment 1-1).

As shown in FIG. 21, when the pushing section of the pushing component 43' rotates clockwise and scrapes against the first toggle rod 47121', it prompts the first toggle rod 47121' to turn inward, causing the second toggle rod 47122' to push outward, touching the toggle blade 4711'. This moves the toggle blade 4711' outwards, making the trigger end 47111' leave the protruding switch 4721', disconnecting the safety switch component 472'. There's a toggle reset spring 47113' between the outer side of the toggle blade 4711' and the casing. When there's no contact between the pushing section and the first toggle rod 47121', the toggle reset spring 47113' pushes the toggle blade 4711' inward to reset, and both the first and second toggle rods also reset sequentially. An inclined guiding surface 471211' is on the outside of the first toggle rod 47121', facilitating a collision with the pushing section during rotation.

The driving and controlling mechanism 40 also includes a crank assembly 50', which is used to push the toggle blade 4711' to link with the safety switch component 472'. The crank assembly 50' consists of an outer crank 51' and an inner crank 52'. The external end of the crank 51' extends out of the casing 20 and protrudes from the muzzle mechanism. The internal end of the outer crank 51' links with the inner crank 52'. As shown in FIG. 21, the inner crank 52' has a short section 521' and a long section 522' set perpendicular to each other. The external side of the short section 521' touches the internal end of the outer crank 51'. The long section 522' extends near the toggle blade 4711' and bends towards it to form a contact section 5221'. Near the contact section 5221' on the toggle blade 4711', there's a contact plate 47114'. The slot 47112' is between the contact plate 47114' and the trigger end 47111'. Beside the contact section 5221', there's a crank reset spring 55'.

In one embodiment, the interaction between the crank assembly and the safety switch component 472' is as follows.

When using the nail gun, first align the front muzzle mechanism with the target area to be nailed. Since the external end of the crank 51' protrudes from the muzzle mechanism, when its external end touches the target, it generates a reaction force on the outer crank 51', causing it to move towards the nail gun side. The internal end of the outer crank 51' will touch the short section 521' of the inner crank 52', thus pushing the inner crank 52' inward. During this movement, the contact section 5221' will touch the contact plate 47114' on the toggle blade 4711', and press the toggle blade 4711' towards the safety switch component 472', causing it to open and generate an electric signal. Then, when the user presses the pressing part 461', it triggers the main switch component 462' to produce an electric signal. When both switches are open, the motor starts, the force spring starts to store energy, and then strike out the nail, completing the nailing process. After nailing, when the external end of the outer crank 51' separates from the target, the crank reset spring 55' will reset both the inner crank 52' and the outer crank 51'. Similar to Embodiment 1-1, there's also a protective cover 54' on the external end of the outer crank 51'. By touching the target with the protective cover 54', it reduces wear on the external end of the outer crank 51', prolonging its lifespan.

Effects and Functionality of the Embodiment

Based on the driving and controlling mechanism and the nail gun of the aforementioned embodiment, because the safety switch's toggle part includes a toggle blade, a toggle rod, and a toggle blade seat, the use of the mutual linkage between the toggle blade, toggle rod, toggle blade seat, and the pushing component serves to switch off the electrical signal of the safety switch. This belongs to a mechanical control method, eliminating the need for an additional controller, thereby saving costs and ensuring more stable operation.

In the driving and controlling mechanism and the nail gun of the aforementioned embodiment, since there's a pushing component 43, and this pushing component 43 directly cooperates with the piston 41 to push the piston 41 towards the force spring 42, thus allowing the force spring 42 to compress and store energy. The pushing component 43 has no direct contact with the striking member 49, avoiding any interference with the movement of the piston 41 due to contact with the striking member 49. This makes the entire energy storage process smoother and more stable.

Additionally, the pushing component 43 has a pushing section facing the piston 41, which contacts the pushing end on the piston 41 during its rotation to facilitate piston movement. This pushing section has both a first pushing section 431 and a second pushing section 432, allowing for both first-stage and second-stage energy storage, maximizing the energy storage capability of the force spring 42. Furthermore, the outer diameters of the first pushing section 431 and the second pushing section 432 are different, allowing for the maximum possible piston 41 movement without changing the length of the pushing end of the piston 41. The greater the working travel, the more the force spring 42 is compressed, hence greater energy can be obtained, and nails can be shot out more powerfully and quickly.

In this embodiment, the pushing component 43 is designed in the shape of a crank corner 430, which, compared to existing technologies like discs, is more lightweight, saving material, reducing energy consumption, and achieving better transmission results.

According to the driving and controlling mechanism provided in this embodiment, there is also a control assembly, which includes the main switch 46 and the safety switch 47. These two switches are connected in series and connected to the drive motor. Thus, the nail gun 10's motor body 441 can be directly controlled based on the nail-shooting electrical signals and safety signals generated by the main switch 46 and safety switch 47. Since the main switch 46 and safety switch 47 are set in series, the motor body 441 can only start when both signals are received and valid, enabling nailing. With the driving and controlling mechanism adopting a dual-switch, double-insurance design, the safety during the nailing process is also ensured.

Furthermore, through this driving and controlling mechanism, the nail gun 10 can activate the safety switch through the crank mechanism when it touches the target location. And when the main switch 46 is pressed, i.e., at startup, it automatically begins to store energy and maintains a fully charged state, making the nailing process extremely convenient for the user with just a single button press.

The aforementioned embodiment is just an example to illustrate the specific implementation method of this invention, and the scope of this invention is not limited to the description of the above embodiment.

For instance, during the implementation process, the one-way rotation component at the output end of the drive motor can be replaced with a one-way bearing instead of a ratchet and pawl structure to achieve the same purpose.

Embodiment 2

In one embodiment, the pushing component has a pushing section facing the piston. The piston is equipped with a pushed-end that matches the pushing section. This pushed-end may include a first pushed-end, extending from the piston in the direction of the nail's striking; a second pushed-end, extending from the piston towards the pushing component. The pushing section may include a first pushing section matching with the first pushed-end, and a second pushing section matching with the second pushed-end, with its outer diameter being smaller than that of the first pushing end.

In one embodiment, the pushing component also has a crank corner, which contains a first crank arm used to install the first pushing section; a second crank arm used to install the second pushing section, and is of equal length to the first crank arm. There's an angle formed between the first crank arm and the second crank arm.

In one embodiment, both the first pushing section and the second pushing section are cylindrical in shape, and they are respectively set at the outer ends of the first crank arm and the second crank arm. The outer ends of the first and second crank arms are arc-shaped, and the outer edge of the first pushing section protrudes from the outer end of the first crank arm.

In one embodiment, the present invention also includes a control assembly, which includes a main switch equipped with a pressing part and a main switch component. This main switch component generates an electrical signal when the pressing part is pressed; a safety switch equipped with an toggle part and a safety switch component. This safety switch component generates an electrical signal when in contact with the toggle part. Among them, the main switch component and the safety switch component are connected in series. When both the main switch component and the safety switch component generate electrical signals, the drive motor operates. When the pushing component rotates under the drive of the motor, the first pushing section contacts and pushes the first pushed-end, causing the piston to move towards the power spring, allowing the power spring to store energy in its first phase. After completing the first phase of energy storage, the second pushing section contacts and pushes the second pushed-end, causing the piston to move towards the power spring, allowing the power spring to store energy in its second phase.

In one embodiment, the toggle part comprises a toggle blade which is used for linkage with the safety switch component, and a toggle rod. One end of the rod links with the toggle blade, and the other end links with the pushing section. The toggle blade contains a triggering end that contacts the safety switch component and a slot for disconnecting from the safety switch component. One side of the toggle blade is equipped with the toggle rod, and the other side has a reset spring for the toggle blade.

In one embodiment, the toggle rod comprises a first toggle rod, disposed close to the pushing section and equipped with a guiding inclined surface for contact with the pushing section; a second toggle rod, disposed close to the toggle blade; and a connecting segment, which links the first and second toggle rods and is pivotally disposed inside the housing via a pivot. When the pushing section scrapes against the first toggle rod during rotation, the second toggle rod contacts and pushes the toggle blade to move.

In one embodiment, the driving and controlling mechanism includes a crank assembly, used to push the toggle blade to link with the safety switch component. It includes an outer crank, the external end of which extends outside the nozzle mechanism of the nail gun and the inner end inserts into the housing of the nail gun. There's also an inner crank, whose external end links with the outer crank and the inner end links with the toggle blade. Near one end of the inner crank, adjacent to the toggle blade, there is a reset spring for the crank.

In one embodiment, the inner end of the inner crank has a touch segment, and the toggle blade also includes a contact plate that matches this touch segment. The slot is located between the contact plate and the triggering end.

The driving and controlling mechanism and nail gun of this invention, which incorporate the pushing component directly working with the piston, ensure smoother and more stable energy storage processes. There's no direct contact between the pushing component and the striking member, preventing movement interference in the piston. Furthermore, the pushing component has a pushing section oriented towards the piston. This pushing section contacts the pushed-end on the piston during its rotational process, prompting the piston to move. The pushing section comprises a first pushing section and a second pushing section, which can independently carry out the first and second energy storage phases, maximizing the energy storage capability of the power spring. At the same time, the outer diameters of the first pushing section and the second pushing section are different. By adjusting the outer diameter of the pushing section without changing the length of the piston's pushed-end, it is possible to achieve the maximum working stroke of the piston movement. The longer the working stroke, the more the power spring is compressed, thereby obtaining greater energy, which can then powerfully and swiftly strike out the nail from the gun.

FIG. 1 is a schematic structural view of the nail gun according to one embodiment of the invention.

Figure 2B:
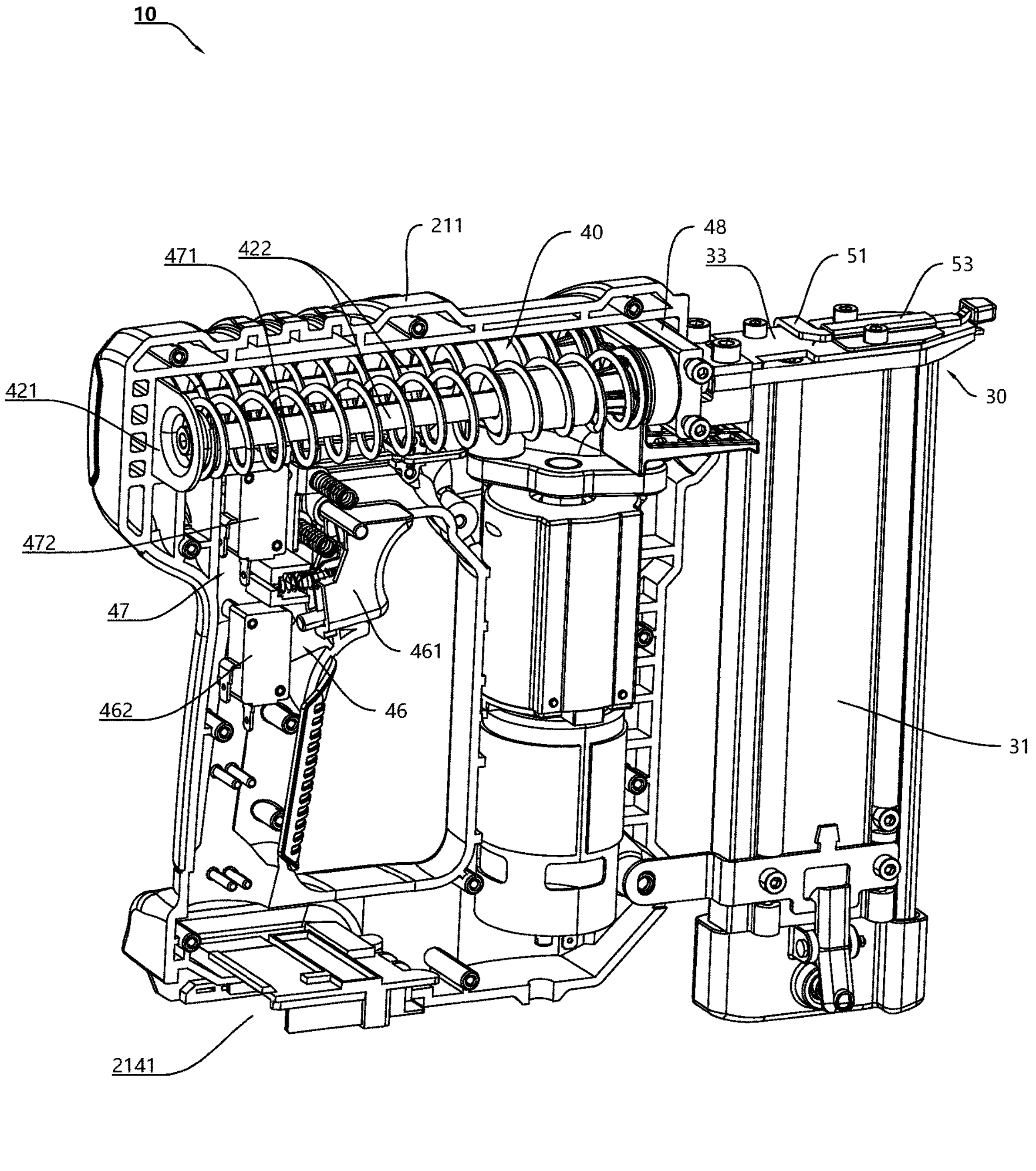
FIG. 2B is a schematic structural view of the nail gun with partial casing removed according to another embodiment of the invention.

FIG. 2B is a schematic structural view of the nail gun with partial casing removed according to another embodiment of the invention.

This embodiment provides a driving and controlling mechanism and a nail gun, which are easier to operate without compromising safety and nailing effects.

As shown in FIGS. 1 and 2B, the nail gun 10 of this embodiment includes a casing 20, a muzzle mechanism 30, a driving and controlling mechanism 40, and a power supply unit (lithium battery 60). The casing 20 is an external case 21, which is formed by coupling a front cover plate 211 with a rear cover plate 212, creating an internal cavity for installing the driving and controlling mechanism 40. The casing 21 not only accommodates internal components like the driving and controlling mechanism 40 but also protects them. The main casing 21 includes a handle 213 for users to grip and a casing base 214 connected to the handle. Both the handle 213 and the casing base 214 are hollow structures. An battery installation slot 2141 locates on the casing base 214 for the detachable installation of the lithium battery 60. The power supply unit powers the entire nail gun. The muzzle mechanism 30 is for storing nails and allowing them to be struck and shot. The driving and controlling mechanism 40 drives the striking member in a predetermined reciprocating movement, enabling it to strike nails from the muzzle mechanism 30.

FIG. 3 is a partial structural diagram of a muzzle mechanism according to one embodiment of the invention.

As depicted in FIGS. 2B and 3, the muzzle mechanism 30 is located at the front end of the casing 21. The muzzle mechanism 30 has a magazine 31 for holding nails, a muzzle member 32 installed at the top of the magazine, and a muzzle cover 33. A nail passage mechanism 34 locates between the muzzle member 32 and the muzzle cover 33, through which nails are shot out by the driving and controlling mechanism 40.

Figure 4B:
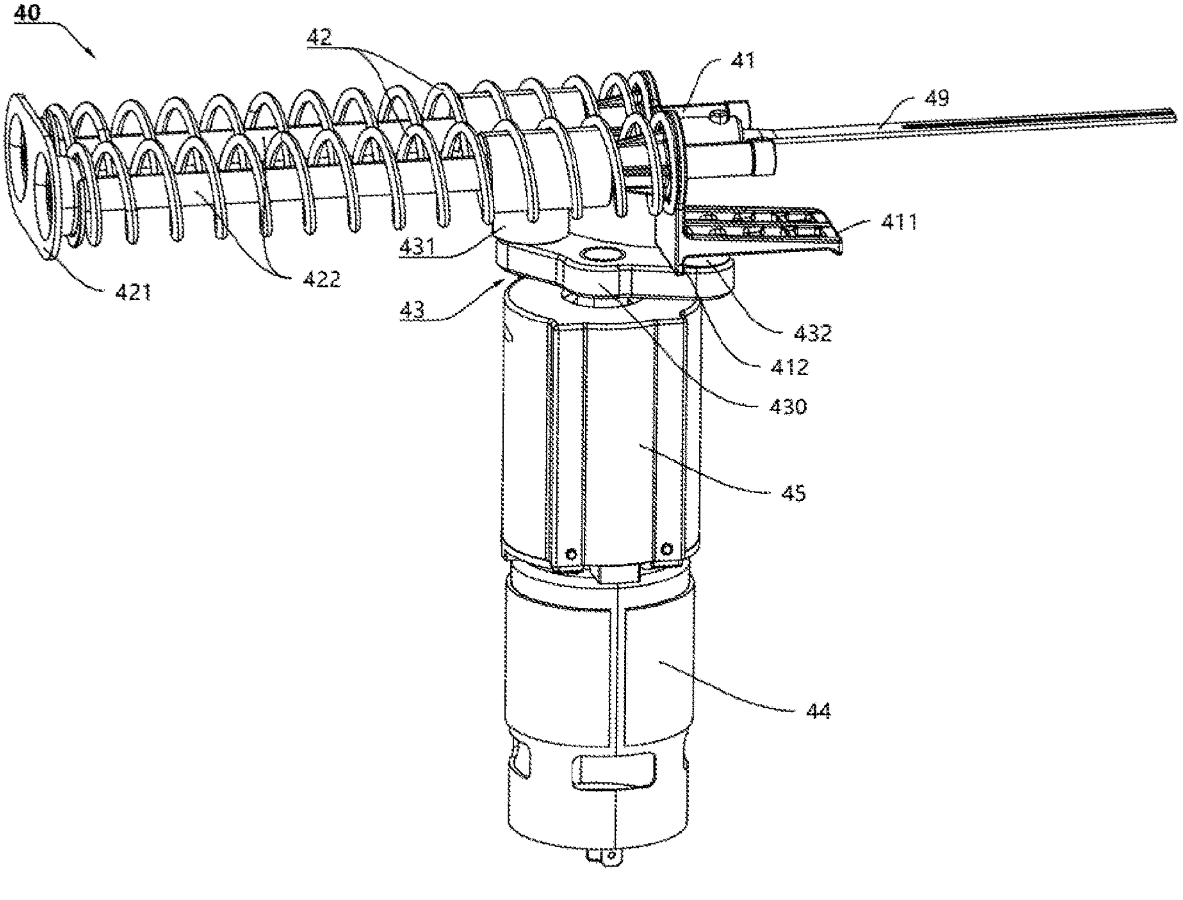
FIG. 4B is a schematic structural view of a driving and controlling mechanism according to another embodiment of the invention.

FIG. 4B is a schematic structural view of a driving and controlling mechanism according to one embodiment of the invention.

As shown in FIG. 4B, the driving and controlling mechanism 40 includes a piston 41 moving within the casing 20, at least one power spring 42, a pushing component 43, and a motor that turns the pushing component 43.

As seen in FIG. 2B, an installation cavity inside the casing 21 has a slot structure. A cylinder head plate 48 is fixed at the front end, and a fixed plate 421 (also plate-shaped in this embodiment) is fixed at the rear end. A pair of parallel guide rods 422 are disposed between the cylinder head plate 48 and the fixed plate 421. As shown in FIG. 4B, this embodiment has two parallel power springs 42, with the front end connected to the piston 41 and the rear end set against the fixed plate 421. Both power springs 42 are placed around the two guide rods 422. One end of each guide rod 422 is secured to the fixed plate 421 with a screw, and the other end passes through the piston 41 to fix onto the cylinder head plate 48. The guide rods 422 direct the piston 41 in its predetermined reciprocating movement.

The front end of the piston 41 is equipped with a striking member 49 to strike and shoot the nails. The rear end of the piston 41 interacts with the power spring 42. Driven by the power spring 42, it moves the piston 41 (i.e., the power spring 42 powers the movement of piston 41). The pushing component 43 has a pushing section directed towards the piston 41, which pushes the piston towards the end where the power spring 42 is located, thus compressing the spring for energy storage. Correspondingly, the piston 41 has a push-end that cooperates with the pushed-end, consisting of a first pushed-end 411 and a second pushed-end 412. The first pushed-end 411 extends from the piston 41 in the nail gun's striking direction, while the second pushed-end 412 extends towards the pushing component 43. The pushing section has a first pushing section 431 that interacts with the first pushed-end 411 and a second pushing section 432 that interacts with the second pushed-end 412. Both the first and second pushing sections, 431 and 432, are cylindrical in structure. As the pushing component 43 turns, it drives both the first and second pushing sections, 431 and 432, to turn. The diameter of the second pushing section 432 is smaller than that of the first pushing section 431, and its height is also shorter.

Figure 5B:
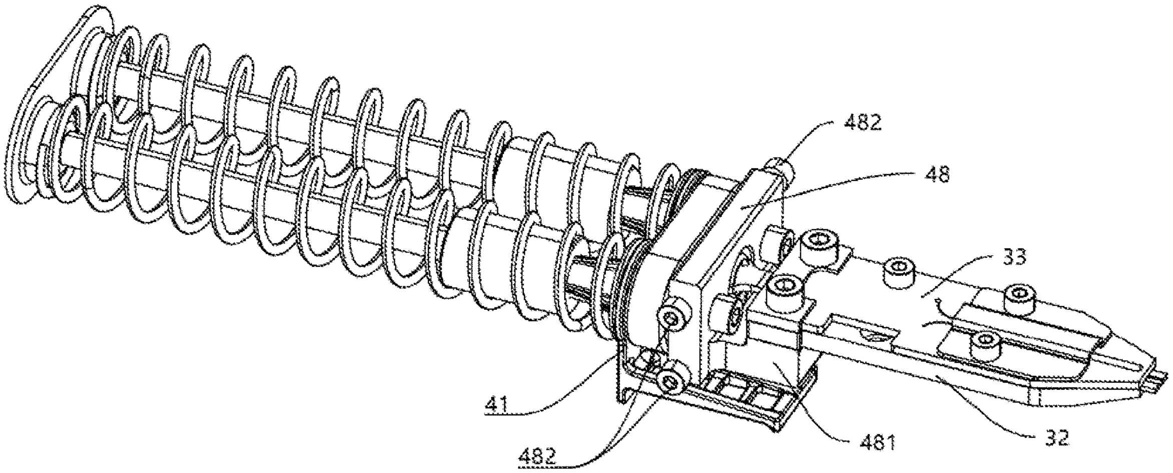
FIG. 5B is a schematic structural view of the muzzle mechanism according to another embodiment of the invention.

FIG. 5B is a schematic structural view of the muzzle mechanism according to another embodiment of the invention.

As shown in FIG. 5B, in one embodiment, the cylinder head plate 48 is positioned ahead of the piston 41 in the striking direction. Its lower end extends forward to form a mounting base plate 481. The muzzle member 32 and the muzzle cover 33 are mounted above this mounting base plate 481 using bolts. The front end of the striking member 49 in the middle of the piston 41 passes through the middle of the cylinder head plate 48 and is inserted into the nail passage 34 between the muzzle member 32 and the muzzle cover 33. The left and right sides of the cylinder head plate 48 are fixed to the casing 21 with mounting screws 482.

Figure 6B:
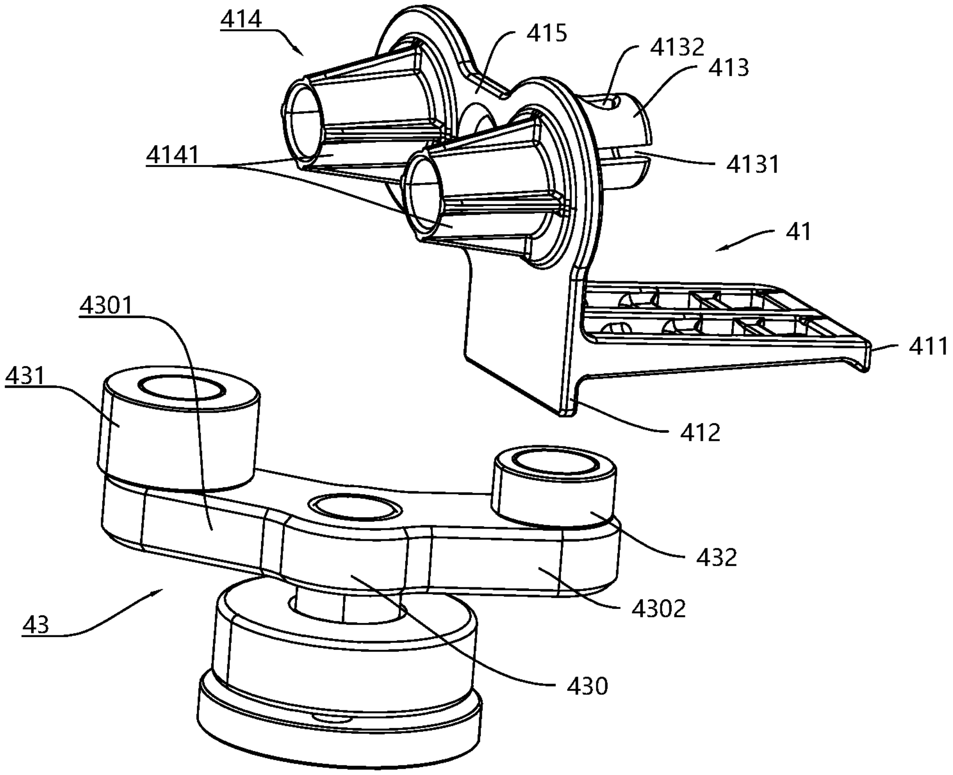
FIG. 6B is an exploded view of the piston and pushing component according to another embodiment of the invention.

FIG. 6B is an exploded view of the piston and pushing component according to another embodiment of the invention.

As shown in FIG. 6B, the piston 41 has a fixed part 413 used to secure the striking member 49. In one embodiment, the fixed part 413 as a whole is similar to a cylindrical shape, the middle of which has a straight slot 4131 axially and a fixing hole 4132 that passes radially through the entire cylinder. One end of the striking member 49 is inserted into the straight slot 4131 and is fixed in place using a pin that is inserted into the fixing hole 4132, thus fixing the striking member 49 onto the fixed part 413. The rear side of the fixed part 413 has an installation part 414 for installing the power spring 42. In one embodiment, this installation part 414 has two cone-shaped seats 4141 set for the power spring. Both of the installation seats 4141, the cylinder head plate 48, and the buffer pad 484 have through holes 483. The front ends of the two guiding rods 422 are fixed to the cylinder head plate 48 through the corresponding two through holes 483. The fixed part 413 is connected to the installation part 414 via a plate-shaped connection part 415. The lower end of the connection part 415 extends downward (in the direction of the pushing component 43) to form a second pushed-end 412. One side of the second pushed-end 412 extends in the direction of the fixed part 413 to form the first pushed-end 411, and the second pushed-end 412 is approximately perpendicular to the first pushed-end 411.

Both the first pushing section 431 and the second pushing section 432 have a cylindrical structure. The pushing component 43 also has a crank corner 430, which consists of a first crank arm 4301 and a second crank arm 4302. The first pushing section 431 is installed at the outer end of the first crank arm 4301, and the second pushing section 432 is installed at the outer end of the second crank arm 4302. Both the first crank arm 4301 and the second crank arm 4302 are of equal length, forming an angle between them, and both their outer ends are arc-shaped. The outer rim of the first pushing section 431 protrudes beyond the outer end of the first crank arm 4301, while the outer rim of the second pushing section 432 is either flush with or slightly indented relative to the outer end of the second crank arm 4302.

As shown in FIG. 4B, the motor includes a motor body 441 and a speed reducing mechanism 45. The speed reducing mechanism 45 is mounted on the output shaft of the motor body 441. The pushing component 43 is mounted on the output end of the speed reducing mechanism 45, and a one-way bearing 70 is disposed between them. Under the drive of the motor body 441 and the speed reducing mechanism 45, the pushing component 43 rotates in one direction. The motor body 441 in this embodiment is a brushless motor. The speed reducing mechanism 45 is mounted on the output shaft of the motor body 441 to reduce the output speed of the motor body 441, thereby obtaining a higher output torque, i.e., a greater driving force. The one-way bearing 70 restricts the rotation direction of the motor 44 (i.e., the output shaft of the speed reducing mechanism 45), allowing it to rotate in only one direction. When the one-way bearing 70 is installed on the speed reducing mechanism 45, it rotates in only one direction. Meanwhile, when the pushing component 43 is subjected to a force that would cause it to rotate in the opposite direction, the one-way bearing 70 bears this force, preventing it from being transmitted to the output shaft and thereby protecting the motor body 441. The specific structures of the motor body 441, the speed reducing mechanism 45, and the one-way bearing 70 adopt those found in existing technology. As shown in FIGS. 1, 2B, and 4B, the motor and the pushing component 43 are almost directly below the piston 41, making the whole structure more compact. The weight is concentrated in the middle of the entire nail gun, which compared to setting the motor and driving assemblies on the side, is more stable and evenly stressed and does not take up extra space.

During installation, a through hole is provided in the middle of the crank corner 430, located between the first crank arm 4301 and the second pushing section 432. The crank corner 430 is installed on the output end of the speed reducing mechanism 45 through this hole and can rotate with the motor body 441 and the speed reducing mechanism 45. Designing the pushing component 43 in the shape of the crank corner 430 is lighter compared to existing technologies that use structures like discs. This design not only saves materials but also reduces energy consumption, resulting in better transmission effects.

When the pushing component 43 rotates, its first pushing section 431 and second pushing section 432 will move in an arc with the crank corner 430 and will cooperate with the first pushed-end 411 and the second pushed-end 412 on the piston 41 to push the piston 41 in the energy storage direction. The shape and height of the first pushing section 431 correspond to the setting of the first pushed-end 411, and the shape and height of the second pushing section 432 correspond to the setting of the second pushed-end 412.

Figure 9B:
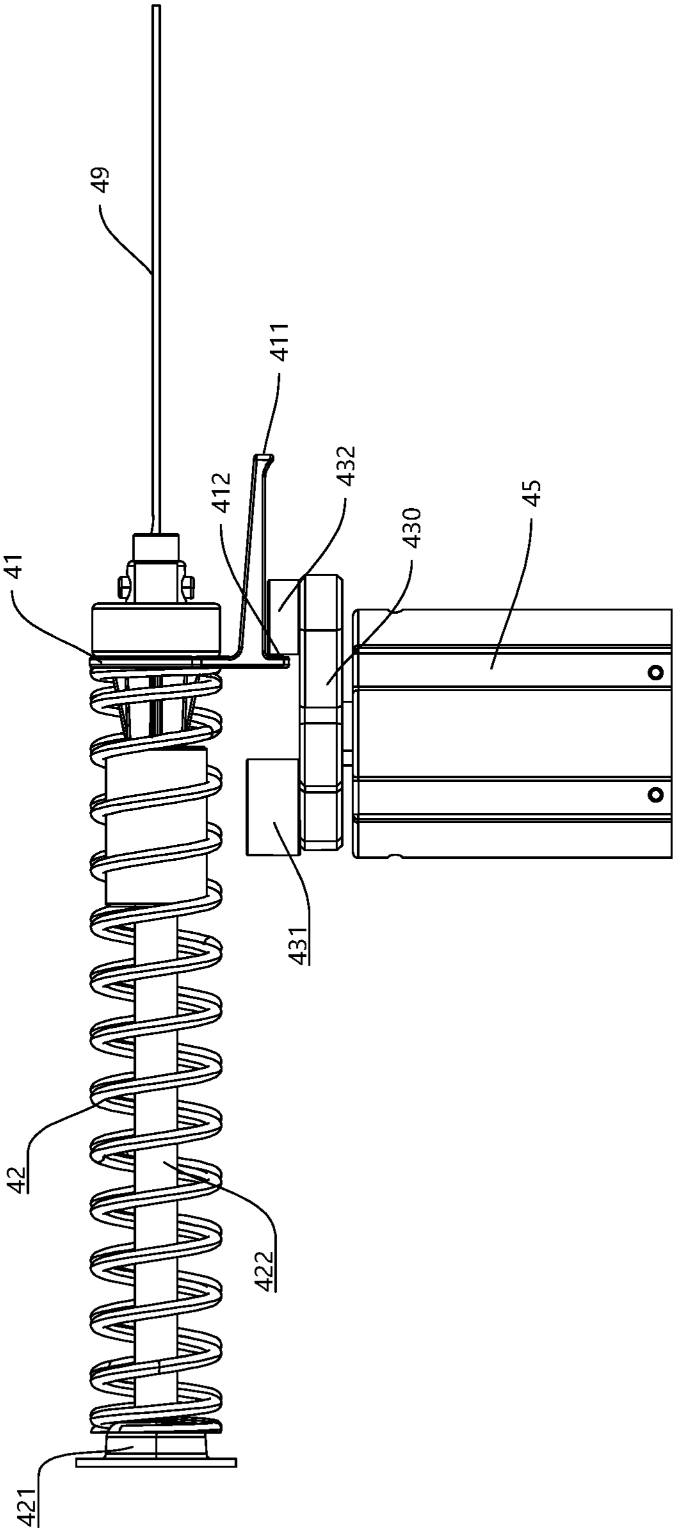
FIG. 9B illustrates a process the pushing component interacts and drives the piston at a first position according to another embodiment of the invention.

FIG. 9B illustrates a process the pushing component interacts and drives the piston at a first position according to one embodiment of the invention.

Figure 10B:
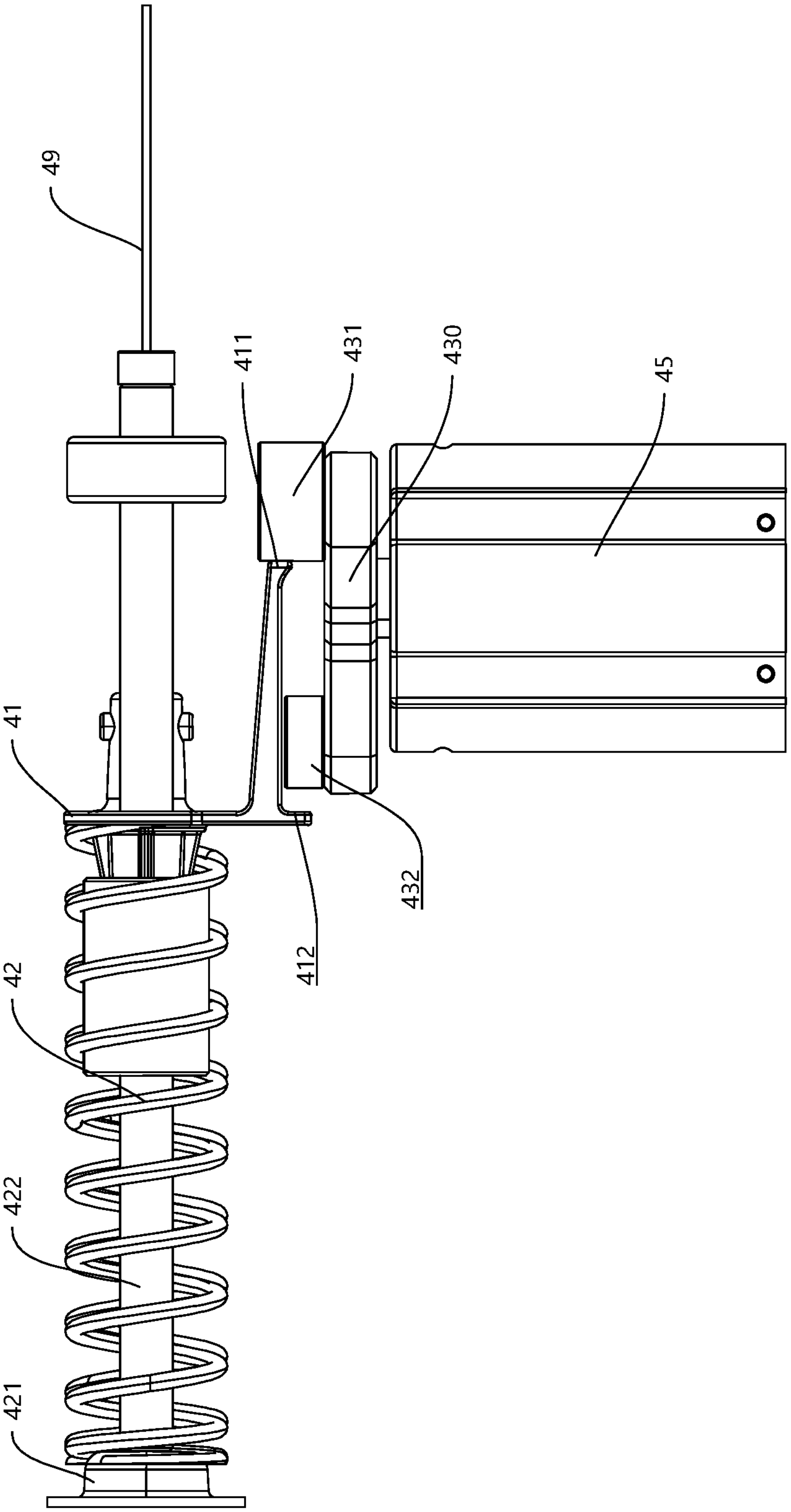
FIG. 10B illustrates a process the pushing component interacts and drives the piston at a second position according to one embodiment of the invention.

FIG. 10B illustrates a process the pushing component interacts and drives the piston at a second position according to one embodiment of the invention.

FIGS. 9B and 10B show the driving and controlling mechanism 43 rotates driven by the driving motor. As depicted, under the drive of the motor body 441, the pushing component 43 rotates clockwise. With its rotation, the second pushing section 432 moves to the second pushed-end 412, and they get in contact with each other. The pushing component 43 continues to rotate, and the second pushing section 432 moves in an arc towards the energy storage direction, applying an arcing force to the piston 41 through the second pushed-end 412. This causes the piston 41 to move along the guide rod 422 in the energy storage direction, compressing the power spring 42 for energy storage. When the second pushing section 432 rotates to its maximum stroke in the energy storage direction, the first phase of energy storage is completed. The pushing component 43 continues to rotate, with the second pushing section 432 subsequently disengaging from the second pushed-end 412. Simultaneously, the first pushing section 431 rotates to meet the first pushed-end 411. It then pushes the piston 41 further in the energy storage direction until the first pushing section 431 rotates to its maximum stroke, completing the second phase of energy storage and the entire spring energy storage process accomplished. In one embodiment, after the second phase of energy storage, nailing is carried out. During nailing, the motor body 441 drives the pushing component 43 to continue rotating, and the first pushing section 431 disengages from the first pushed-end 411. At this point, both the first and second pushed-ends are out of the piston's path, allowing the piston 41 to move in the nail striking direction under the force of the power spring 42. This continues until the striking member 49 hits the nail, completing the nailing process. During the above-mentioned first or second phase of energy storage, the crank corner 430, due to the one-way bearing, will not rotate in reverse under the force of the piston 41, preventing accidental shooting of the nails.

The motor 44 drives the pushing component 43, which in turn pushes the piston 41. This action causes the power spring 42 to be compressed for energy storage, and finally, the piston 41 is pushed out under the force of the power spring 42.

FIG. 11 is a cross section view of the piston and the pushing component in contact with each other according to one embodiment of the invention.

FIG. 12 is a cross section view of the piston and the pushing component in contact with each other according to a control design.

In this embodiment, both the first pushing section 431 and the second pushing section 432 are cylindrical. The external diameter of the second pushing section 432 is designed to be smaller than that of the first pushing section 431, and they are not equal. This design can enlarge the piston's stroke compared to having equal external diameters. An experiment showed in FIGS. 11-12, in this embodiment, the external diameter of the first pushing section 431 is 18 mm (radius 9 mm), and the external diameter of the second pushing section 432 is 14 mm (radius 7 mm). The distance between the first pushed-end 411 and the second pushed-end 412 of the piston is 35 mm, and the experimental working stroke achieved is 81.5 mm. In contrast, as shown in FIG. 12, in the control group of this embodiment, the external diameters of the first pushing section 431 and the second pushing section 432 are both 14 mm (radius 7 mm). The distance between the first and second pushed-ends of the piston is 35 mm, and the experimental working stroke achieved is 79.5 mm, clearly less than the stroke achieved in this embodiment.

The calculations for the above work mode are as follows.

The working stroke is represented as S. The distance between the first pushed-end and the second pushed-end of the piston is L. The angle between the first pushing section 431 and the second pushing section 432 is denoted as n (that is, the angle between the first crank arm 4301 and the second pushing section 432). The formula for calculating the arc length traversed by the rotation of the first pushing section 431 and the second pushing section 432 is: $1=n\pi R/180°$. When the first pushing section 431 and the second pushing section 432 have the same diameter (both with a radius of R), the working stroke of the piston is $S=L+1=L+)(n\pi R/180°$. When the first pushing section 431 and the second pushing section 432 have different diameters (with radii R1 and R2 respectively), the working stroke is $S=L+1+(R1-R2)$. It is evident that when the diameters are not equal, the piston's working stroke is longer by a distance of $(R1-R2)$ compared to when the diameters are equal. This means that by adjusting the diameter of the pushing section without changing the length of the piston's pushed-ends, it is possible to achieve the maximum working stroke. The greater the working stroke, the more the power spring 42 is compressed, thereby obtaining a greater energy, allowing for a more forceful and rapid striking of the nail. Additionally, since the nail gun structure needs to be compact, it is ideal to minimize the design length of the nail gun, which is also beneficial for operation, packaging, and transportation.

As shown in FIG. 2B, the driving and controlling mechanism 40 also includes a control assembly, which includes a main switch 46 and a safety switch 47. They are connected in series to the lithium battery 60 and the motor 44. When both the main switch 46 and the safety switch 47 have an electric signal, the motor body 44 can be controlled to operate. The main switch 46 is a button-type switch with a pressing part 461 and a main switch component 462. The main switch component 462 can generate a corresponding startup electric signal when the pressing part 461 is pressed. The safety switch 47 is a linkage-type switch with a toggle part 471 and a safety switch component 472. The safety switch component 472 can generate an electric signal when it contacts the toggle part 471. In this embodiment, both the main switch component 462 and the safety switch component 472 use microswitches. When both components generate an electric signal, the motor body 441 operates, driving the pushing component 43 to rotate and complete the aforementioned spring energy storage process.

Figure 13B:
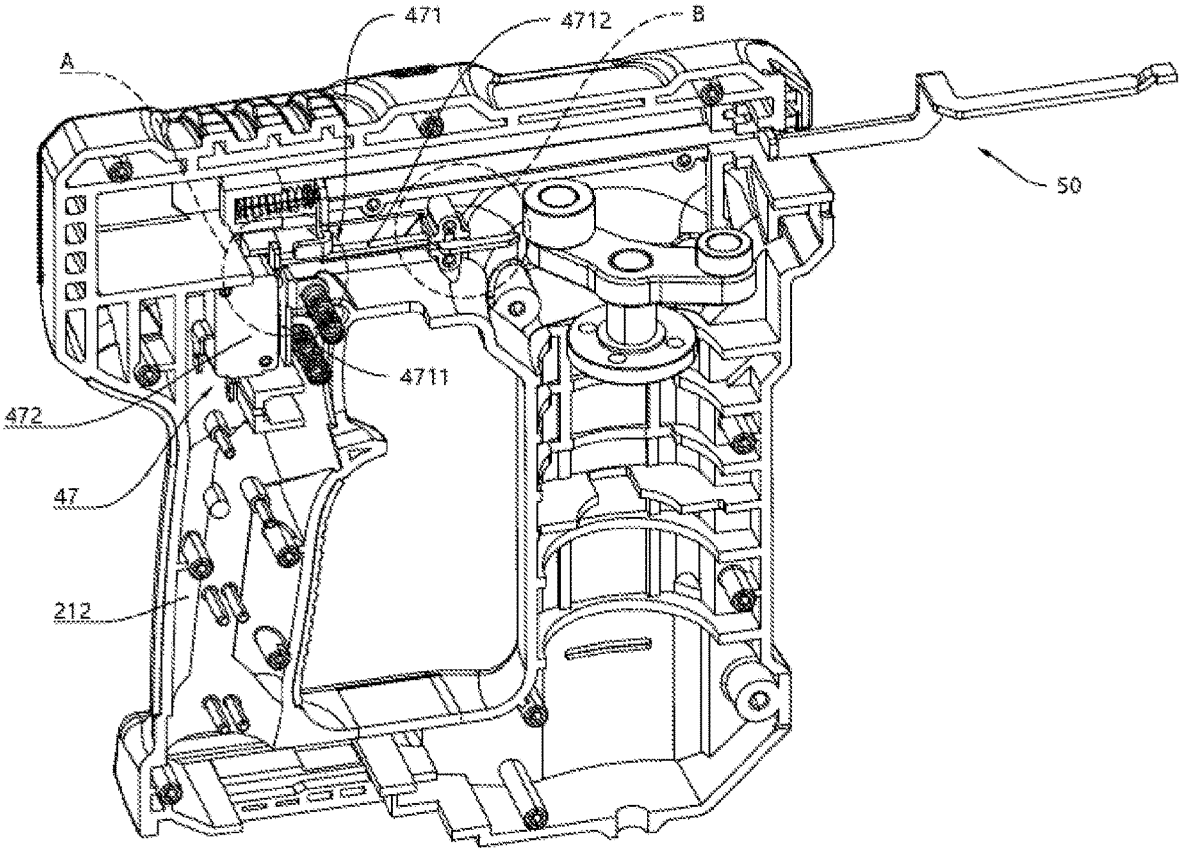
FIG. 13B is a schematic structural view of a safety switch installed inside the casing according to another embodiment of the invention.

FIG. 13B is a schematic structural view of a safety switch installed inside the casing according to one embodiment of the invention.

Figure 14B:
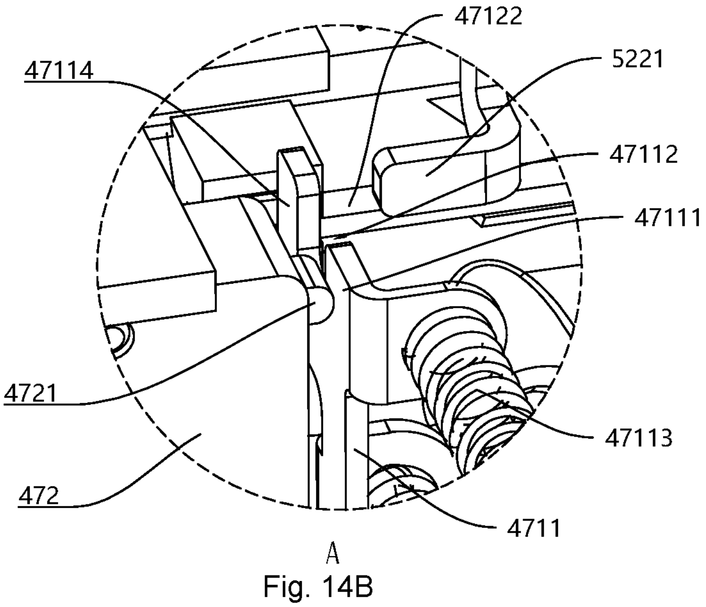
FIG. 14B is an enlarged view of the part A in FIG. 13B.

FIG. 14B is an enlarged view of the part B in FIG. 13B.

Figure 17B:
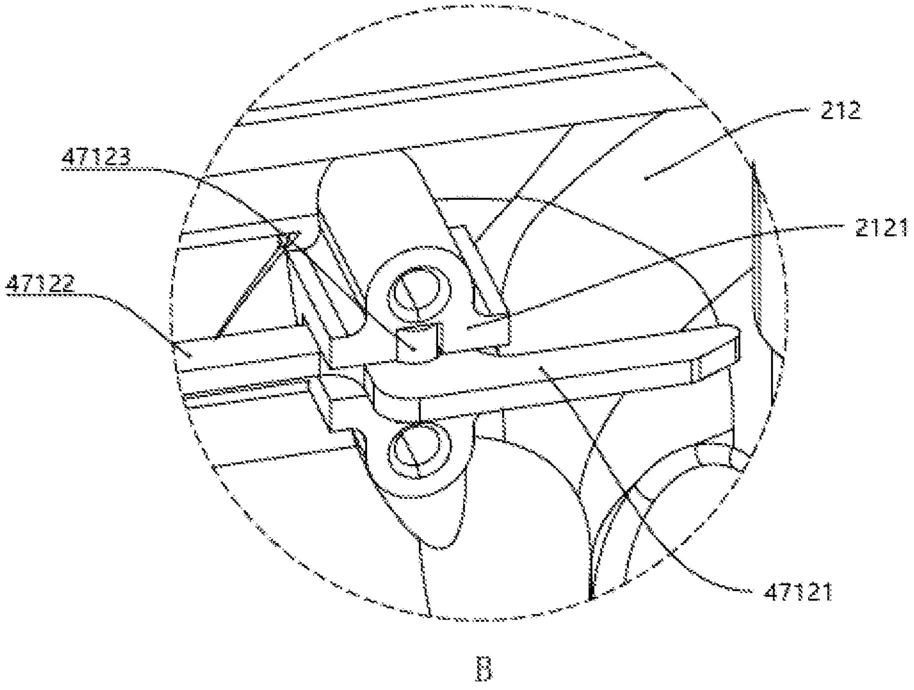
FIG. 17B is an enlarged view of the part B in FIG. 13B.

FIG. 17B is an enlarged view of the part B in FIG. 13B.

As shown in FIG. 13B, the toggle part 471 of the safety switch 47 comprises an toggle blade 4711 and an toggle rod 4712. The toggle blade 4711 is located on one side of the safety switch component 472 and interacts with it. The linkage method is: one side of the safety switch component 472 is equipped with a protrusion switch 4721. The toggle blade 4711 is equipped with a trigger end 47111. When the trigger end 47111 touches the protrusion switch 4721, it triggers the safety switch component 472 to turn on and generate an electrical signal. Beside the trigger end 47111, there's an opening slot 47112. When the toggle blade 4711 moves, and the trigger end 47111 leaves the protrusion switch 4721, and when the protrusion switch 4721 aligns with the opening slot 47112, the safety switch component 472 disconnects.

The toggle rod 4712 is a long rod bent at one end and is used to control the movement of the toggle blade 4711. Specifically, the toggle rod 4712 includes a first toggle rod 47121 and a second toggle rod 47122. The end of the first toggle rod 47121 is set near the pushing section of the driving assembly 43 and will collide (scrape) during the rotation of the pushing section. The end of the second toggle rod 47122 is on the inside of the toggle blade 4711. The connection section where the first toggle rod 47121 and the second toggle rod 47122 are joined has a toggle pin 47123. A protrusion inside the rear cover plate 212 of the casing 20 provides a toggle rod installation position 2121 for the toggle pin 47123. The toggle rod 4712 is rotatably mounted at the toggle rod installation position 2121 through this toggle pin 47123.

Figure 18B:
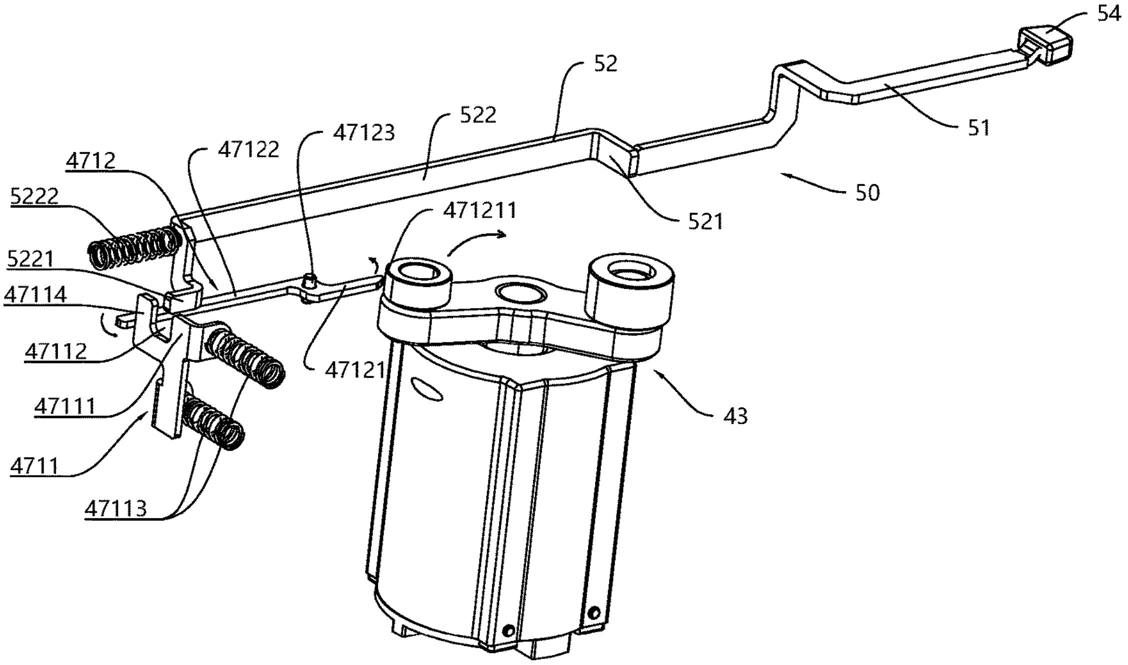
FIG. 18B is one of the schematic diagrams showing the installation position of the safety switch and the crank mechanism according to another embodiment of the invention.

FIG. 18B is one of the schematic diagrams showing the installation position of the safety switch and the crank mechanism according to another embodiment of the invention.

As shown in FIG. 18B, when the pushing section of the driving assembly 43 rotates clockwise, once it scrapes the first toggle rod 47121, it will cause the first toggle rod 47121 to rotate inward. According to the lever principle, the second toggle rod 47122 will rotate outward, touch the toggle blade 4711, and push the toggle blade 4711 to move outward. This will cause the contact plate 47111 to leave the protrusion switch 4721. At this time, the safety switch component 472 will disconnect the electrical signal, and the drive motor will immediately stop working.

Because there is a toggle reset spring 47113 between one side of the toggle blade 4711 and the casing 21, when there is no contact between the pushing section and the first toggle rod 47121, the toggle reset spring 47113 will push the toggle blade 4711 back to its original position. The first toggle rod 47121 and the second toggle rod 47122 will also reset in sequence. The outer side of the first toggle rod 47121 can be set with an inclined guiding surface 471211, making it more convenient for the pushing section to collide with the first toggle rod 47121 during rotation.

The driving and controlling mechanism 40 includes a crank assembly 50, which is designed to promote the linkage between the toggle blade 4711 and the safety switch component 472. The crank assembly 50 includes an outer crank 51 and an inner crank 52. As depicted in FIGS. 1 and 2A, the external end of the crank 51 extends out of the casing 20 and is attached to the muzzle cover plate 33 of the muzzle mechanism via a pressure plate 53. The external end protrudes from the muzzle mechanism, and the internal end of the outer crank 51 is linked with the inner crank 52 inside the casing 20. As shown in FIGS. 18B and 19, the inner crank 52 has a short section 521 and a long section 522, set perpendicular to each other. The external side of the short section 521 contacts the internal end of the outer crank 51. The long section 522 extends near the toggle blade 4711 and bends towards the toggle blade 4711, forming a contact section 5221. On the toggle blade 4711, near the position of the contact segment 5221, there is a contact plate 47114. The opening slot 47112 is located between the contact plate 47114 and the trigger end 47111. On one side of the contact segment 5221, there is a crank reset spring 5222.

The linkage between the crank assembly 50 and the safety switch component 472 works as follows.

During the nail gun's use, the muzzle mechanism, located at the front, is first aligned with the target area to be nailed. Since the external end of the crank 51 protrudes from the muzzle mechanism, when it touches the target area, it generates a reactionary force on the outer crank 51, causing it to move toward the side of the nail gun. The internal end of the outer crank 51 will touch the short section 521 of the inner crank 52, pushing the inner crank 52 inward. During its movement, the outer crank rod 51 prompts the contact segment 5221 to come into contact with the contact plate 47114 on the toggle blade 4711. This presses the toggle blade 4711 towards the side of the safety switch component 472, causing the safety switch component 472 to turn on and generate an electrical signal. Subsequently, when the user presses the pressing part 461, it triggers the main switch component 462 to turn on and produce an electrical signal. When both switch components are in the "on" state, the motor 44 starts, the force spring begins to store energy, and then fires the nail out, realizing the nailing process. After the nailing is completed, when the outer end of the outer crank rod 51 separates from the target part, the crank reset spring 5222 will drive the inner crank rod 52 and the outer crank rod 51 to reset.

After nailing is complete and the user removes the nail gun, the external end of the outer crank 51 separates from the target area. At this point, the crank reset spring 5222 drives both the inner crank 52 and the outer crank 51 to reset. As shown in FIG. 18B, the external end of the outer crank 51 also has a protective cover 54, which when in contact with the target area, reduces wear on the external end of the crank 51, extending its lifespan.

Working Principle of Embodiment 2

When using the nail gun, the front-facing muzzle mechanism is first aligned with the target nailing area. The outer crank 51 is pushed, causing the inner crank moving inward, activating the safety switch component 472 to produce an electrical signal. Then, the user activates the main switch component 462 to create another electrical signal. At this point, since both the main and safety switches generate electrical signals, the motor 44 starts, driving the drive component 43 to rotate. The drive component 43, during its rotation, causes the piston 41 to move toward the power spring 42, compressing it and storing energy in two stages. After the second energy storage stage is complete, nailing can commence. During nailing, the motor body 441 continues to drive the drive component 43 to rotate. The first drive end 431 rotates, disengaging from the first pushed-end 411. At this point, both the first pushing section 431 and the second pushing section 432 are outside the movement path of the piston 41. The piston 41, under the force of the power spring 42, moves in the direction of nailing until the striking member 49 strikes the nail, shoot it out, completing the nailing process. Simultaneously, because the outer rim of the first pushing section 431 protrudes, as it rotates, it will scrape against the first toggle rod 47121, prompting the first toggle rod 47121 to rotate inward. This pushes the second toggle rod 47122 outward, touching the toggle blade 4711 and moving it outward, causing the trigger end 47111 to separate from the protrusion switch 4721.

In the driving and controlling mechanism and the nail gun of the aforementioned embodiment, since there's a pushing component 43, and this pushing component 43 directly cooperates with the piston 41 to push the piston 41 towards the force spring 42, thus allowing the force spring 42 to compress and store energy. The pushing component 43 has no direct contact with the striking member 49, avoiding any interference with the movement of the piston 41 due to contact with the striking member 49. This makes the entire energy storage process smoother and more stable.

Additionally, the pushing component 43 has a pushing section facing the piston 41, which contacts the pushing end on the piston 41 during its rotation to facilitate piston movement. This pushing section has both a first pushing section 431 and a second pushing section 432, allowing for both first-stage and second-stage energy storage, maximizing the energy storage capability of the force spring 42. Furthermore, the outer diameters of the first pushing section 431 and the second pushing section 432 are different, allowing for the maximum possible piston 41 movement without changing the length of the pushing end of the piston 41. The greater the working travel, the more the force spring 42 is compressed, hence greater energy can be obtained, and nails can be shot out more powerfully and quickly.

In this embodiment, the pushing component 43 is designed in the shape of a crank corner 430, which, compared to existing technologies like discs, is more lightweight, saving material, reducing energy consumption, and achieving better transmission results.

According to the driving and controlling mechanism provided in this embodiment, there is also a control assembly, which includes the main switch 46 and the safety switch 47. These two switches are connected in series and connected to the drive motor which is connected to a power source. Thus, the nail gun 10's motor body 441 can be directly controlled based on the nail-shooting electrical signals and safety signals generated by the main switch 46 and safety switch 47. Since the main switch 46 and safety switch 47 are set in series, the motor 44 can only start when both signals are received and valid, enabling nailing. With the driving and controlling mechanism adopting a dual-switch, double-insurance design, the safety during the nailing process is also ensured.

Furthermore, through this driving and controlling mechanism, the nail gun 10 can activate the safety switch through the crank mechanism when it touches the target location. And when the main switch 46 is pressed, i.e., at startup, it automatically begins to store energy and maintains a fully charged state, making the nailing process extremely convenient for the user with just a single button press.

The foregoing description of the exemplary embodiments of the invention has been presented only for the purposes of illustration and description and is not intended to be exhaustive or to limit the invention to the precise forms disclosed. Many modifications and variations are possible in light of the above teaching.

The embodiments were chosen and described in order to explain the principles of the invention and their practical application so as to enable others skilled in the art to utilize the invention and various embodiments and with various modifications as are suited to the particular use contemplated. Alternative embodiments will become apparent to those skilled in the art to which the invention pertains without departing from its spirit and scope. Accordingly, the scope of the invention is defined by the appended claims rather than the foregoing description and the exemplary embodiments described therein.

Some references, which may include patents, patent applications and various publications, are cited and discussed in the description of this invention. The citation and/or discussion of such references is provided merely to clarify the description of the invention and is not an admission that any such reference is "prior art" to the invention described herein. All references cited and discussed in this specification are incorporated herein by reference in their entireties and to the same extent as if each reference was individually incorporated by reference.

What is claimed is:

1. A driving and controlling mechanism used for a nail gun, comprising:

a driving assembly disposed inside a casing of the nail gun for striking nails in a striking direction; and a control assembly controlling the driving assembly;

wherein the driving assembly comprises a piston movably disposed inside the casing and attached to a striking member for striking the nails; at least one power spring in contact with the piston; a pushing component for pushing the piston towards the at least one power spring; and a motor for rotating the pushing component;

wherein the control assembly comprises a main switch configured to produce a first electronic signal; and a safety switch configured to produce a second electronic signal;

wherein the main switch and the safety switch are in communication with the motor such that the motor is configured to operate when it receives both the first electronic signal and the second electronic signal;

wherein the main switch comprises a pressing part and a main switch component; the safety switch comprises a toggling part and a safety switch component; and wherein the toggling part comprises a toggle blade which is configured to contact an activation point of the safety switch component to generate the second electronic signal; a toggle rod having a first toggle rod end configured to contact the pushing component and a second toggle rod end configured to contact with the toggle blade to push it to disconnect from the activation point of the safety switch component; and a toggle blade seat having a toggle blade reset spring; wherein a first end of the toggle blade reset spring is in contact with the toggle blade; and a second end of the toggle blade reset spring extends out of the toggle blade seat and is in contact with the toggle rod.

2. The driving and controlling mechanism of claim 1, wherein the toggle blade is hook-shaped and comprises a contact plate for contacting the activation point of the safety switch component; a toggling plate for contacting the toggle rod; and a connecting plate connecting the contact plate and the toggling plate.

3. The driving and controlling mechanism of claim 2, wherein the contact plate has a contact plate length which is shorter than a length of the toggling plate; and wherein a gap is formed by the difference between the contact plate length and the toggling plate length.

4. The driving and controlling mechanism of claim 3, wherein the second electronic signal is generated when the activation point of the safety switch component touches the contact plate; and wherein the second electronic signal is cut off when the activation point locates in the gap.

5. The driving and controlling mechanism of claim 4, wherein the toggle rod comprises a first toggle rod having an end disposed near the pushing component; a second toggle rod having an end disposed on inside of the toggle blade; and a connecting section connecting the first and second toggle rods and rotatably disposed in the casing via a toggle pin; and wherein when the pushing component rotates and rubs against the first toggle rod, the second toggle rod pushes the toggle blade to move.

6. The driving and controlling mechanism of claim 5, wherein the controlled driving assembly further comprises a crank assembly for pushing the toggle blade to interact with the safety switch component; wherein the crank assembly comprises an external crank with its outer end extending out of a muzzle mechanism of the nail gun and its inner end inserted into the casing of the nail gun; and an internal crank with its outer end connected to the external crank and its inner end connected to the toggle blade seat; and a crank reset spring disposed adjacent to the internal crank outer end.

7. The driving and controlling mechanism of claim 6, wherein the pushing component comprises a first pushing section and a second pushing section; wherein the piston comprises a first pushed-end and a second pushed-end.

8. The driving and controlling mechanism of claim 7, wherein the first pushed-end extends from the piston in the striking direction; and the second pushed-end extends from the piston towards the pushing component.

9. The driving and controlling mechanism of claim 8, wherein the first pushing section is configured to push the first pushed-end; and the second pushing section is configured to push the second pushed-end.

10. The driving and controlling mechanism of claim 9, wherein the first pushing section has a diameter larger than a diameter of the second pushing section.

11. The driving and controlling mechanism of claim 10, wherein the pushing component further comprises a crank corner; wherein the crank corner comprises a first crank arm on which the first pushing section is disposed, and a second crank arm on which the second pushing section is disposed; and wherein the first crank arm and the second crank arm form a corner having degree less than 180 degree.

12. The driving and controlling mechanism of claim 11, wherein the first pushing section and the second pushing section are cylindrical and are respectively disposed on an outer end of the first crank arm and the second crank arm; and wherein the first pushing section protrudes from an outer end of the first crank arm.

13. The driving and controlling mechanism of claim 12, wherein the pushing component is installed on an output end of the motor; wherein a one-way rotating component is disposed between the pushing component and the output end of the motor.

14. The driving and controlling mechanism of claim 13, wherein the one-way rotating component comprises a ratchet disposed on the output end of the motor; a ratchet claw disposed in adjacent to the ratchet and is configured to be received by at least one gap formed between more than one teeth of the ratchet; and a ratchet claw spring in contact with the ratchet.

15. The driving and controlling mechanism of claim 14, wherein the nail gun further comprises a speed reducer disposed in connection with the output end of the motor and in connection with the one-way rotating component.

16. The driving and controlling mechanism of claim 15, wherein when the pushing component rotates, the first pushing section pushes the first pushed-end causing the piston to move towards the at least one power spring for a first period of time, achieving a first energy storage phase.

17. The driving and controlling mechanism of claim 16, wherein when first energy storage phase is accomplished, the second pushing section pushes the second pushed-end causing the piston to move towards the at least one power spring for a second period time, achieving a second energy storage phase.

18. A nail gun for striking nails in a striking direction, comprising:

a casing having a cavity;

a muzzle mechanism installed on a front end of the casing;

a power source; and the driving and controlling mechanism of claim 3 disposed in the cavity of the casing and connected to the power source for striking the nails in the striking direction.

* * * * *